(12) United States Patent
Brakob

(10) Patent No.: US 12,468,919 B2
(45) Date of Patent: Nov. 11, 2025

(54) GIFT CARD HAVING COIN REACTIVE INK AND OTHER TAMPERPROOF PROPERTIES

(71) Applicant: Target Brands, Inc., Minneapolis, MN (US)

(72) Inventor: Christopher Brakob, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/941,375

(22) Filed: Nov. 8, 2024

(65) Prior Publication Data

US 2025/0245472 A1    Jul. 31, 2025

Related U.S. Application Data

(60) Provisional application No. 63/626,311, filed on Jan. 29, 2024.

(51) Int. Cl.
*G06K 19/18*  (2006.01)
*G06K 19/06*  (2006.01)

(52) U.S. Cl.
CPC ....... *G06K 19/18* (2013.01); *G06K 19/06028* (2013.01)

(58) Field of Classification Search
CPC .................. G06K 19/18; G06K 19/06028
(Continued)

(56) References Cited

U.S. PATENT DOCUMENTS

| 4,398,708 A | 8/1983 | Goldman et al. |
| 5,286,061 A | 2/1994 | Behm |

(Continued)

FOREIGN PATENT DOCUMENTS

| CA | 172324 | 7/2018 |
| CA | 187373 | 8/2020 |

(Continued)

OTHER PUBLICATIONS

"Anti-Counterfeiting Ink Printing Overview", Holo solution Inc., Dec. 24, 2020, accessed on Oct. 11, 2024 at https://www.holoteam.com/post/anti-counterfeiting-ink-en, 13 pages.

(Continued)

*Primary Examiner* — Allyson N Trail
(74) *Attorney, Agent, or Firm* — Barnes & Thornburg LLP

(57) ABSTRACT

Disclosed herein are tamperproof gift cards. A gift card can include: a first identifier printed in permanent and visible ink on a treated first portion of the gift card and a second identifier printed in a matrix of ink dots on a second portion that obscures the second identifier. Attempting to remove the first identifier may cause visible indicators of tampering on the first portion. The matrix can include reactive and other non-reactive ink dots that, as printed, have a same visible appearance. The second identifier can be represented by the reactive ink dots. Rubbing the matrix with a physical object can cause the reactive and non-reactive ink dots to have different physical appearances so that the second identifier becomes visible. The gift card can also include tamperproof properties applied in layers that may cause modifications to the first or second portions of the gift card to become permanently visible.

20 Claims, 12 Drawing Sheets

(58) Field of Classification Search
USPC .......................................................... 235/494
See application file for complete search history.

(56) References Cited

U.S. PATENT DOCUMENTS

| | | | |
|---|---|---|---|
| 5,500,514 | A | 3/1996 | Veeneman et al. |
| 5,791,474 | A | 8/1998 | Hansen |
| 5,803,504 | A | 9/1998 | Deshiens et al. |
| 6,022,051 | A * | 2/2000 | Casagrande ........... B42D 5/027 283/109 |
| 6,142,533 | A | 11/2000 | Borowski, Jr. |
| D450,760 | S | 11/2001 | Luciano et al. |
| D493,829 | S | 8/2004 | Foster |
| 6,832,720 | B2 | 12/2004 | Dawson |
| D522,052 | S | 5/2006 | Lubking |
| D524,654 | S | 7/2006 | Keiichi et al. |
| 7,290,705 | B1 | 11/2007 | Shin |
| 7,354,004 | B2 | 4/2008 | Andersen et al. |
| 7,374,095 | B2 | 5/2008 | Blank et al. |
| 8,251,285 | B2 | 8/2012 | Kingsborough et al. |
| 8,430,298 | B2 | 4/2013 | Martinez et al. |
| 8,523,078 | B2 | 9/2013 | Biskupski |
| 8,594,286 | B2 | 11/2013 | New et al. |
| 8,622,436 | B2 | 1/2014 | Mehta et al. |
| 8,727,213 | B2 | 5/2014 | Wilen |
| 8,939,354 | B1 | 1/2015 | Hinson et al. |
| D734,388 | S | 7/2015 | Lin et al. |
| RE45,762 | E | 10/2015 | Raksha et al. |
| D785,334 | S | 5/2017 | Holt et al. |
| D813,302 | S | 3/2018 | Getachew et al. |
| D854,615 | S | 7/2019 | Hamilton et al. |
| D881,270 | S | 4/2020 | Narayan et al. |
| D940,569 | S | 1/2022 | Pierron et al. |
| 11,379,810 | B2 | 7/2022 | Curtis |
| D963,471 | S | 9/2022 | Larson |
| 2001/0022446 | A1 | 9/2001 | Klure |
| 2004/0209028 | A1 * | 10/2004 | Gosselin ............... G09F 3/0292 428/40.1 |
| 2005/0038714 | A1 | 2/2005 | Bonet et al. |
| 2007/0096457 | A1 | 5/2007 | Cahill |
| 2007/0110964 | A1 * | 5/2007 | Beier ............... G06K 19/06046 428/195.1 |
| 2007/0224398 | A1 | 9/2007 | Raksha et al. |
| 2007/0251989 | A1 * | 11/2007 | Grossman ............... A63F 3/065 235/487 |
| 2007/0272743 | A1 | 11/2007 | Christie et al. |
| 2008/0217415 | A1 | 9/2008 | Royer |
| 2009/0038968 | A1 | 2/2009 | Smith |
| 2009/0282994 | A1 * | 11/2009 | Kubert ................... B41M 3/005 101/142 |
| 2009/0322538 | A1 * | 12/2009 | Kobren ............... G09F 3/0292 427/258 |
| 2013/0112758 | A1 * | 5/2013 | Edmisten ............... G11B 5/842 118/620 |
| 2014/0116908 | A1 | 5/2014 | Beyer et al. |
| 2018/0053157 | A1 | 2/2018 | Roffey |
| 2019/0073577 | A1 * | 3/2019 | Tomczyk ......... G06K 19/07381 |
| 2022/0027912 | A1 * | 1/2022 | Chaum ............... G06Q 20/409 |
| 2022/0415112 | A1 * | 12/2022 | Weisbecker ......... G06Q 20/354 |
| 2024/0416618 | A1 * | 12/2024 | Frye ....................... G06F 21/78 |
| 2025/0156846 | A1 * | 5/2025 | Bhoora ............... G06Q 20/354 |

FOREIGN PATENT DOCUMENTS

| | | |
|---|---|---|
| CN | 302370719 | 3/2013 |
| CN | 302924774 | 8/2014 |
| CN | 303070306 | 1/2015 |
| CN | 303070307 | 1/2015 |
| CN | 303090171 | 1/2015 |
| CN | 303480618 | 12/2015 |
| CN | 304105177 | 4/2017 |
| CN | 304209564 | 7/2017 |
| CN | 305698549 | 4/2020 |
| CN | 306019714 | 8/2020 |
| CN | 308044830 | 5/2023 |
| CN | 308777793 | 8/2024 |
| DE | 402023202640-0007 | 5/2024 |
| EM | 015055010-0001 | 4/2024 |
| EP | 1514695 | 3/2005 |
| EP | 1514695 A1 | 3/2005 |
| GB | 4022615 | 1/2012 |
| GB | 4035911 | 7/2014 |
| GB | 9003064179-0002 | 4/2016 |
| GB | 9003064179-0003 | 4/2016 |
| GB | 9003064179-0004 | 4/2016 |
| GB | 9003064179-0005 | 4/2016 |
| GB | 9003081405-0001 | 4/2016 |
| GB | 9003081405-0002 | 4/2016 |
| GB | 9003081405-0003 | 4/2016 |
| GB | 9003081405-0004 | 4/2016 |
| GB | 6062822 | 6/2019 |
| GB | 6103479 | 10/2020 |
| GB | 6341541 | 1/2024 |
| JP | D1561094 | 10/2016 |
| JP | D1568183 | 1/2017 |

OTHER PUBLICATIONS

Diane Wilson, "How scammers can drain gift cards before you even buy them", abc11.com, accessed on Oct. 11, 2024 at https://abc11.com/gift-card-scams-buy/5742144/, 4 pages.

Eva Sgroi, "Beware of Apple Gift Card Scam", itnewsafrica.com, Jul. 14, 2023, accessed on Oct. 11, 2024 at https://www.itnewsafrica.com/2023/07/beware-of-apple-gift-card-scam/, 1 page.

Gidget Alikpala, "How do scammers rip off Walmart gift card holders? Fraud prevention techniques", en.as.com, accessed on Oct. 11, 2024 at https://en.as.com/latest_news/how-do-scammers-rip-off-walmart-gift-card-holders-fraud-prevention-techniques-n/, 8 pages.

Michael Schwartz, "Gift card balance drained before used, how hackers do it", wkbw.com, accessed on Oct. 11, 2024 at https://www.wkbw.com/7problemsolvers/gift-card-balance-drained-before-used-how-hackers-do-it, 7 pages.

Take your package design beyond the expected, traveltags.com, accessed on Oct. 11, 2024 at https://www.traveltags.com/card-services/card-packaging, 3 pages.

"What is a Gift Card Scam?", giftcards.com, accessed on Oct. 14, 2024 at https://web.archive.org/web/20240620004819/https://www.giftcards.com/blog/giftcard-scams, 12 pages.

* cited by examiner

GIFT CARD HAVING COIN REACTIVE INK AND OTHER TAMPERPROOF PROPERTIES

INCORPORATION BY REFERENCE

This application claims the benefit of U.S. Provisional Patent Application No. 63/626,311, filed Jan. 29, 2024, the entirety of which is incorporated herein.

TECHNICAL FIELD

This disclosure generally describes devices, systems, apparatuses, and methods related to gift cards having coin reactive ink and/or holograms for gift card verification during a checkout process in a retail environment, such as a physical store.

BACKGROUND

Physical gift cards have often been made of a plastic material and include a pre-generated unique card number used to identify the card and to redeem the stored value associated with the card. Such pre-generated unique card numbers can be generated and printed on gift cards prior to their placement on a shelf or other retail display, and prior to the gift card being purchased during a retail checkout process.

To provide added security, gift cards have often been pre-generated to include a PIN or other validating identifier that is paired with the unique gift card number and used to validate purchases made with the gift card. For example, the gift card can be printed or otherwise generated with the card number and the PIN, and then put on a shelf in a retail environment, such as a store. The card number and/or the PIN can sometimes be exposed while on display on the shelf. Sometimes, the gift card may be printed with a message, images, or other information on a surface of the card.

When a retail customer purchases the gift card, the card number can be scanned and the gift card can be activated for redemption by presenting the card number in combination with the PIN. Sometimes, the PIN can be physically covered on the card with a protective film or other tamper-proof material that can prevent the PIN from being viewed unless the film or other tamper-proof material is at least partially removed. To reveal or otherwise view the PIN, a customer may scratch off the film or other tamper-proof material.

SUMMARY

The disclosure generally describes devices, systems, apparatuses, and methods related to gift cards having identifiers, such as access codes and/or PIN numbers, printed with coin reactive ink that becomes visible in response to scratching a surface of the gift card where one or more identifiers is printed with a coin. The disclosed technology can therefore provide a physical gift card configuration for securely maintaining the gift card so that one or more of the card's identifiers may not be compromised before a customer can purchase, activate, and/or use that card. The gift card may have multiple identifiers or values that are used by a recipient to redeem and use the stored value associated with the gift card. For example, the gift card can include a gift card identifier and a separate PIN value that, together, are used to validate the gift card for use. One or more of these identifiers can be printed with coin reactive ink or provided with other tramper proof properties that permit for their values to be obscured or otherwise not visible until a physical action is performed on the identifiers, such as scratching the identifiers with a coin, and which also may be actions that are non-reversible—preventing potentially malicious actors from viewing the hidden/obscured identifiers and then reapplying the material that obscured or otherwise made the identifiers non-visible. For example, a gift card may already have an identifier (e.g., card number, PIN, access code) printed onto the card with coin reactive ink that may become permanently visible once scratched at with a coin. Therefore, the identifier can be invisible until the coin is applied with pressure to a portion of the gift card having the identifier. Unlike films or other materials that may cover PINs, which may also be reapplied after removed, the ink used with the disclosed gift cards can remain visible once it has been scratched/activated, thereby making it difficult for a malicious actor to make the card appear untampered after the PIN has already been revealed. The gift card described herein may additionally include a hologram or other type of holographic emblem as an additional point of verification that the gift card has not been tampered with or replaced with a false card after tampering. If removal of the hologram is attempted, the hologram is destroyed, which can visually indicate attempted tampering by a malicious actor. This additional security measure or point of validation/verification may prevent malicious actors from attempting to reprint cards for which they have revealed the corresponding PINs.

The gift card described throughout this disclosure may be generated by printing one or more layers on a printing material, where each layer has unique solvent, reactive, and/or erasure properties. These properties can be applied to different portions of the gift card (some overlapping, some being mutually exclusive) to cause the card to be secure and tamper-proof before the card can be purchased by a guest in a retail environment.

The generated gift card can also be secured in packaging. The packaging may include cellophane. The cellophane can wrap around an entirety of the gift card. The cellophane can wrap around an entirety of the gift card and the packaging. Sometimes, artwork or other graphics and/or text can be printed onto the packaging, the cellophane, or a combination thereof to cause the card to be secure and tamper-proof. If, as an illustrative example, a guest in the retail environment selects a gift card off of a display and the gift card appears to have ripped cellophane and/or a visible pin or other visible identifier (which means a coin was used to scratch at the coin reactive ink used to print the identifier on the card), then the guest can discard the gift card and select a different gift card off of the display. After all, the gift card has been compromised. The guest can check whether the identifier is visible on the newly-selected gift card before purchasing the card, thereby ensuring that the card has not been tampered with.

One or more embodiments described herein can include a gift card having: a first identifier printed in permanent and visible ink on a first portion of the gift card, where attempting to remove the first identifier can cause visible indicators of tampering on the first portion of the gift card, the first portion of the gift card being treated with one or more chemicals to cause the visible indicators of tampering thereon. The gift card can also have a second identifier printed in a matrix of ink dots on a second portion of the gift card that, as printed, obscure the second identifier, the matrix including reactive ink dots and other non-reactive ink dots that, as printed, may have a same visible appearance. The second identifier can be represented by the reactive ink dots, the reactive ink dots can be configured to have a different visible appearance from the non-reactive ink dots when the matrix is rubbed by a physical object, and where rubbing the matrix with the physical object can be configured to cause the reactive ink dots and the non-reactive ink dots to have the different physical appearances so that the second identifier becomes visible. The gift card can also include tamperproof properties applied in one or more layers to the first and second portions of the gift card, the tamperproof properties being configured to cause modifications to the first or second portions of the gift card to become permanently visible.

In some implementations, the embodiments described herein can optionally include one or more of the following features. For example, attempting to remove the first identifier can include applying a physical eraser object to the first portion of the gift card having the first identifier, the tamperproof properties applied to the first portion of the gift card including anti-erasure properties, and the visible indicators of tampering on the first portion of the gift card including (i) discoloration or (ii) a change in texture. The physical object can include a coin. The first identifier can include a barcode. As another example, the tamperproof properties applied to the second portion of the gift card can include reactive properties, and when a chemical or solvent may be applied to the second portion of the gift card in an attempt to tamper with the second identifier printed in the matrix, the second portion of the gift card can change in appearance, the change in appearance including at least one of a change in color or a change in texture. Sometimes, the tamperproof properties applied to the second portion of the gift card can include anti-erasure properties, and when a physical eraser object is applied to the second portion of the gift card in an attempt to tamper with the second identifier printed in the matrix, the second portion of the gift card can change in appearance. The change in appearance can include removal of artwork or text printed onto the second portion of the gift card.

In some implementations, the gift card can include packaging that can be configured to removably attach to at least an edge of the gift card. The second portion of the gift card may be visible when removably attached to the packaging. The packaging can include artwork that may be the same as artwork on the a front surface of the gift card, the artwork on the front surface of the gift card aligning with the artwork on the packaging, and, when the gift card is removably attached to the packaging, the artwork on the front surface of the gift card may not be visible. Sometimes, the packaging can include an envelope, the envelope defining an opening to receive the gift card therein, the gift card being removably attached to an interior side of the envelope. The packaging can include a transparent material that can be configured to wrap around at least one edge of the packaging or the gift card.

As another example, the gift card can include a cellophane material that can be configured to wrap around at least one edge of the gift card, the cellophane material being at least partially transparent. The cellophane material can also include a third identifier printed thereon, the third identifier having tamperproof properties and overlaying at least one of the first or second portions of the gift card. The gift card can include a first surface and a second surface opposite the first surface. The first surface can include at least one of the first identifier or the second identifier. The second surface can include at least one of the first identifier or the second identifier. The gift card further can include a hologram, and attempting to remove the hologram may cause visible damage to at least one of the hologram or an area of the gift card to which the hologram was affixed. Sometimes, the second identifier can include a unique identifier for the gift card or a PIN for the gift card. One or more of the first and second portions of the gift card may overlap with each other.

One or more embodiments described herein can include a method for generating a physical gift card with tamperproof properties, the method including: receiving a paper material for generating a physical gift card, treating a first portion of the gift card with one or more chemicals to cause visible indicators of attempted tampering thereon, printing a first identifier in permanent and visible ink on the treated first portion of the paper material, printing a second identifier in a matrix of ink dots on a second portion of the gift card that, as printed, obscure the second identifier, the matrix including reactive ink dots and other non-reactive ink dots that, as printed, can have a same visible appearance, the second identifier being represented by the reactive ink dots, the reactive ink dots being configured to have a different visible appearance from the non-reactive ink dots when the matrix is rubbed by a physical object, where rubbing the matrix with the physical object can be configured to cause the reactive ink dots and the non-reactive ink dots to have the different physical appearances so that the second identifier becomes visible, applying, in layers, one or more additional tamperproof properties to the first or second portions of the paper material, the additional tamperproof properties being configured to cause attempts at tampering with the first or second identifiers to become visible on the paper material.

The method can optionally include one or more of the following features. For example, the applying step can be performed before printing the first and second identifiers. Applying, in layers, one or more additional tamperproof properties to the first or second portions of the paper material can include applying, in a first layer, chemical reactor properties to the first or second portions of the paper material, the chemical reactor properties causing the first or second portions of the paper material to change in appearance when an attempt to tamper the paper material has been made, the change of appearance including a change in color or a change in texture to the first or second portions of the paper material. As another example, applying, in layers, one or more additional tamperproof properties can include affixing a hologram to a third portion of the paper material, where affixing the hologram to the third portion of the paper material can cause the third portion of the paper material to show visible damage when an attempt to tamper with the hologram has been made. As yet another example, applying, in layers, one or more additional tamperproof properties to the first or second portions of the paper material can include applying anti-erasure properties to the first or second portions of the paper material, the anti-erasure properties causing erasure marks on the first or second portions of the paper material to become permanently visible when an attempt to tamper with the paper material has been made. In some implementations, the method can include removably attaching the gift card to a packaging, where at least an area of the gift card may remain visible when attached to the packaging.

The devices, system, and techniques described herein may provide one or more of the following advantages. For example, the disclosed technology can limit or otherwise prevent an ability of users to steal or otherwise compromise gift card PINs and subsequently drain card funds upon activation of those cards. The disclosed technology can provide document security for card authentication purposes. Since the PIN remains invisible on the gift card until a coin is used to scratch at a location on the gift card having the PIN (and once scratched with a coin, the PIN remains visible), guests and other relevant users may easily and quickly identify when the gift card has been compromised. Further, a malicious actor may not easily replace the tampered-with gift card since the card can be printed with a hologram that may not be easily reproducible. The gift card may additionally or alternatively be packaged with cellophane and graphics that may not be easily reproducible and/or replaceable should the card be tampered with by a malicious actor.

As another example, the disclosed technology does not require changes to be made to product operational experiences, guest and/or team member time, and/or infrastructure at the retail environment, thereby making implementation seamless, intuitive, quick, and low cost. Generating or printing the gift cards with a coin reactive ink may not cause a significant change in cost, if any. Sometimes, generating and printing the gift cards with coin reactive ink instead of inks commonly used can result in the cards being less expensive to produce. The disclosed technology can also improve customer experiences with the retail environment for the reasons mentioned above.

Similarly, the gift cards described herein may seamlessly work with existing systems in retail environments to enhance security of those gift cards, even though identifying information may be printed onto the gift cards using coin reactive ink rather than traditional approaches of printing identifying information onto the gift cards. Printing information consistently onto the gift cards may not require changes to scanning devices, POS terminals or other computing systems used to purchase, validate, and verify the gift cards.

The details of one or more implementations are set forth in the accompanying drawings and the description below. Other features and advantages will be apparent from the description and drawings, and from the claims.

Figure 1:
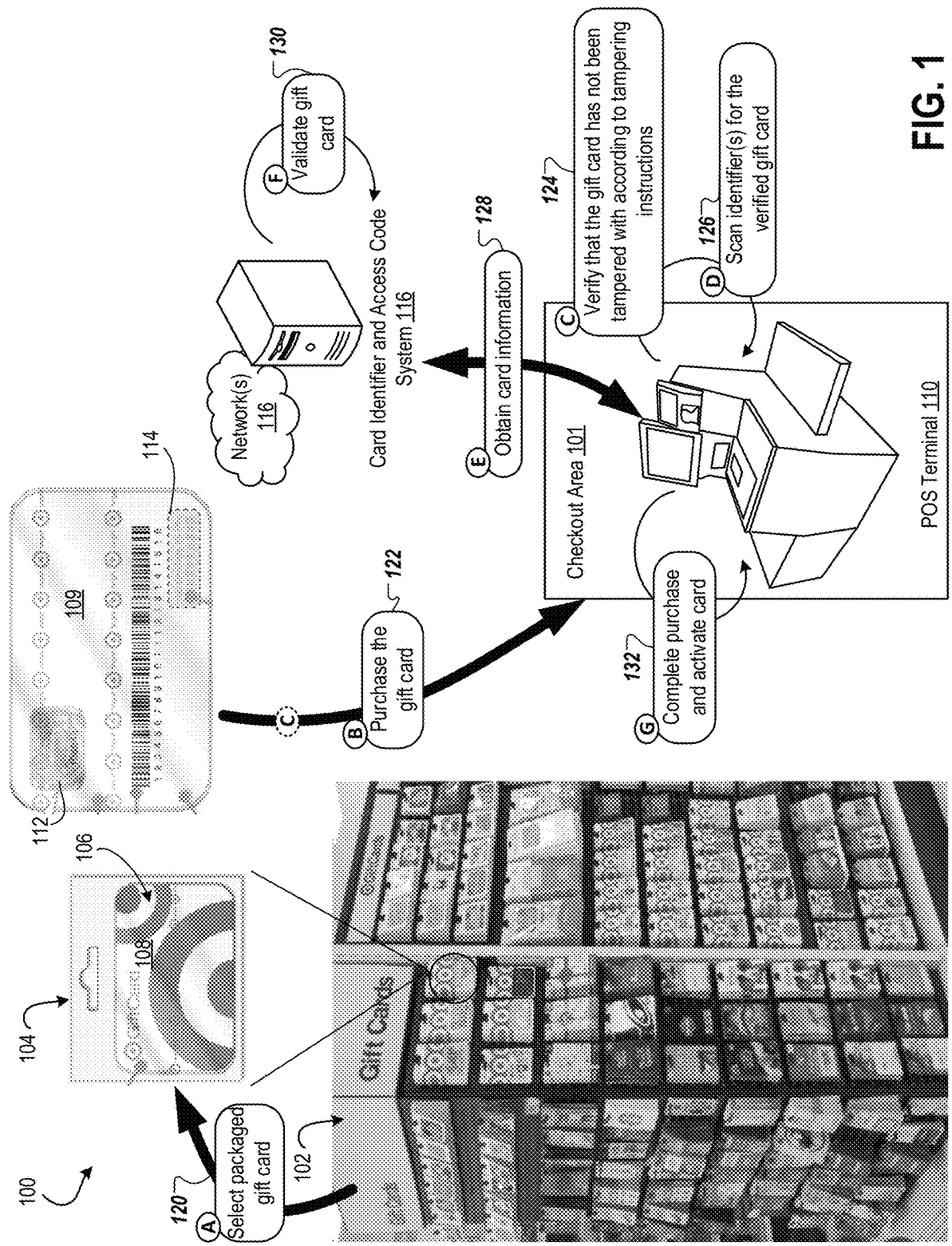
FIG. 1 is a conceptual diagram of a system for verifying and purchasing a physical gift card during a checkout process.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to systems, methods, apparatus, and techniques for a physical gift card that is generated with an identifier, such as a card number, a PIN, and/or an access code, printed in invisible ink (e.g., coin reactive ink) that becomes permanently visible once scratched with a coin. Unlike applying a film or other material to cover a PIN, which can be reapplied once removed, the invisible ink stays visible once it has been scratched/activated so that it can be difficult for a malicious actor to make the card appear untampered with after the PIN has already been revealed. The physical gift card can be generated with one or more additional solvent, reactive, and/or erasure properties to further secure the card against potential tampering. As another example, the gift card can be generated with a hologram or other similar holographic emblem, which can serve as an additional point of verification that the card has not been tampered with, thereby deterring or otherwise preventing malicious actors from attempting to reprint a gift card for which they have revealed an associated PIN. The gift card can also be packaged with cellophane to further secure the card against tampering and compromise.

Traditionally, a gift card can include a PIN that is covered with a protective film but otherwise identifiable/locatable on the card. A user may scratch off the protective film to view the PIN, which allows the user to make purchases with the gift card as a form of payment. Some malicious actors take gift cards off the shelves before the gift cards are purchased and activated, go to an offsite location where the malicious actors remove the protective films, record the PINs in association with the gift card numbers (or other combinations of identifying information that is pre-generated on the gift cards) into a system, reapply the protective films, and put the gift cards back on the shelves in the retail environment. The intention of this scheme is to make the protective film or other tamper-proof material that has been reapplied to the cards appear authentic and original so that other, legitimate users (e.g., guests) within the store proceed to purchase the cards. While these recorded and compromised gift cards are on the shelves or other in-store displays, the malicious actors may poll online gift card systems using the recorded gift card number and PIN numbers (or other identifiers) until those cards are purchased and activated by the legitimate users, at which point the online gift card systems return a positive response to the polling queries by the malicious actors. Once a positive response is received, the malicious actors transfer and/or use the stored value associated with the gift cards to another account—effectively draining the stored value associated with the gifts cards without the knowledge of the legitimate user. Then, the purchasing users (and/or other users receiving the gift cards) cannot utilize the gift cards because the malicious actors who scratched off the protective films and recorded the PINs have already drained the funds from the now-activated cards using the previously-recorded identifying information (e.g., combination of gift card numbers and PINs).

The disclosed technology addresses these concerns and other gift card scams by providing a physical implementation of gift cards having identifying information printed in ink that only becomes visible upon scratching with a coin. Once the coin is used to scratch the gift card, the identifying information becomes permanently visible. If the gift card's identifying information is visible before a checkout process or purchase by a legitimate guest in the retail environment, then the card likely has been compromised and should be discarded.

Referring to the figures, FIG. 1 is a conceptual diagram of a system 100 for verifying and purchasing a physical gift card during a checkout process. The system 100 can be implemented in a retail environment, such as a store. The system 100 can include a gift card display 102, which may include various different gift cards for purchase, such as a gift card package 104. The display 102 can be positioned anywhere inside the retail environment. A guest (e.g., customer, user) who wishes to purchase the gift card package 104 can remove the package 104 from the display 102, as described below.

The system 100 can also include a POS terminal 110 in a checkout area 101. In some implementations, the retail environment can include a plurality of checkout lanes, checkout terminals, and/or checkout stations in the checkout area 101, each checkout location having a respective POS terminal. The checkout area 101 can include checkout locations that are operated by employees, team members, or other relevant users working in the retail environment. The checkout area 101 can include one or more self-checkout stations.

The POS terminal 110 can be configured to perform, process, and complete a checkout process in the checkout area 101. For example, the POS terminal 110 can include one or more scanning devices and/or displays. The POS terminal 110 can be used to scan items for purchase by the guest, present transaction information for the scanned items, receive payment information for the scanned items, and complete the checkout process for the scanned items.

The POS terminal 110 can communicate (e.g., wired, wirelessly) via network(s) 116 with a card identifier and access code system 116. The system 116 can be any type of computing system, network of computing devices, cloud-based computing system, and/or remote computing system. In some implementations, the system 116 can be part of the POS terminal 110. The system 116 can be configured to generate, assign, associate, validate, and/or activate the gift card package 104 (and/or a particular gift card that is packaged) at the time of purchase.

The gift card package 104 can include a gift card 108 sealed within the packaging. As described further herein, the package 104 can include cellophane or another type of clear wrap/material that is configured to wrap around the package 104 and enclose the gift card 108. The cellophane of the package 104 can provide visibility to artwork, text, or graphics on a front surface 106 of the gift card 108.

The cellophane of the package 104 can also provide visibility to a barcode, access code, card number, and/or other identifying information on a back surface 109 of the gift card 108. For example, the back surface 109 of the gift card 108 may include a hologram 112 and a coin reactive matrix 114. The hologram 112, as described further herein, can be a visual indicator of authenticity. If a malicious actor attempts removal of the hologram 112, the hologram 112 is destroyed, which becomes visually apparent on the gift card 108 through the cellophane of the package 104. The coin reactive matrix 114 may hide a PIN or other access code for the card, until a coin is rubbed against the matrix 114. Once the coin is rubbed against the matrix 114, coin reactive black dots of ink become visible in the matrix 114, thereby visually and permanently exposing the PIN for the gift card 108. If a malicious actor rubs a coin against the matrix 114, the PIN would be visible through the cellophane of the package 104, thereby providing a visual indicator that the gift card 108 has been tampered with and thus compromised. Refer to FIGS. 2A, 2B, 3, 4, 5A, 5B, and 5C for further discussion about the hologram 112 and the coin reactive matrix 114.

Still referring to FIG. 1, a guest can select the gift card package 104 having the gift card 108 from the display 102 (block A, 120). The gift card 108 and the envelope 104 can be separate components.

The guest can proceed to the checkout area 101 to purchase the gift card 108 in the package 104 (block B, 122). For example, at the POS terminal 110, the guest (or a team member working in the checkout area 101) can verify that the gift card 108 (and/or the package 104) has not been tampered with according to tampering instructions (block C, 124). The tampering instructions can be presented on a display in a graphical user interface (GUI) presented at the POS terminal 110. The tampering instructions can be presented on a portion of the gift card package 104 in some implementations. The tampering instructions can indicate that the guest should check whether the cellophane of the package 104 has been ripped, removed, or tampered with in some other way. The tampering instructions can indicate that the guest should check whether the PIN is visible in the coin reactive matrix 114. The tampering instructions can indicate that the guest should check whether the hologram 112 has been tampered with in any way. If the guest identifies that the card 108 and/or the package 104 has been tampered with according to the instructions, the card 108 and the package 104 can be discarded. The guest can retrieve a new gift card package 104 from the display 102. The guest can be given a new gift card package 104 in the checkout area 101 by a team member.

In some implementations, the guest can verify that the card 108 and/or the package 104 has not been discarded once the guest selects the package 104 from the display 102 (block A, 120) and before the guest purchases the gift card package 104 (block B, 122). Therefore, the guest can immediately select a new gift card package 104 from the display 102 before going to the checkout area 101.

If, on the other hand, the guest verifies that the card 108 and/or the package 104 has not been tampered according to the instructions (block C, 124), the guest can continue through the checkout process. For example, the guest (or the relevant team member working in the checkout area 101) can scan at least one identifier for the card 108 (e.g., a barcode visible on the back surface 109 of the card 108 through the package 104) (block D, 126). Additionally or alternatively, an identifier on the package 104 can be scanned. Such identifier(s) can be scanned using one or more scanning devices, including but not limited to a scanner, barcode scanner, cameras, imaging devices, handheld scanning device, flatbed scanner, or other scanning device in the checkout area 101, at the POS terminal 110.

The POS terminal 110 may transmit the scanned identifier(s) to the card identifier and access code system 116 to obtain information about the card 108 in the package 104 (block E, 128). This communication can be performed securely, using one or more encryption techniques.

The system 116 may validate the card 108 and/or the package 104 in block F (130). Validating the card 108 (and/or the package 104) may include checking the scanned identifier for the card 108 against known identifiers for other cards that are available for purchase in the retail environment. The known identifiers for the other cards can be stored in one or more data stores and/or databases. The system 116 can verify that the card 108's identifier is not associated with another gift card and/or package. The system 116 can verify that the card 108's identifier is associated with a gift card that has not yet been activated.

Once the card 108 is validated, the system 116 may provide the card information to the POS terminal 110 (block E, 128). The card information can indicate that the card 108 has not been activated or compromised.

In response, the POS terminal 110 can complete the purchase of the gift card package 104 and activate the card 108 (block G, 132). The gift card 108 can be added to a transaction for the guest, which may be displayed in the GUI at the display screen of the POS terminal 110 (or at a mobile device of the guest). The guest purchasing the gift card package 104 at the POS terminal 110 can provide a form of payment, which can be processed by the POS terminal 110 to complete the purchase, apply funds to the card 108, and activate the card 108.

Figure 2A:
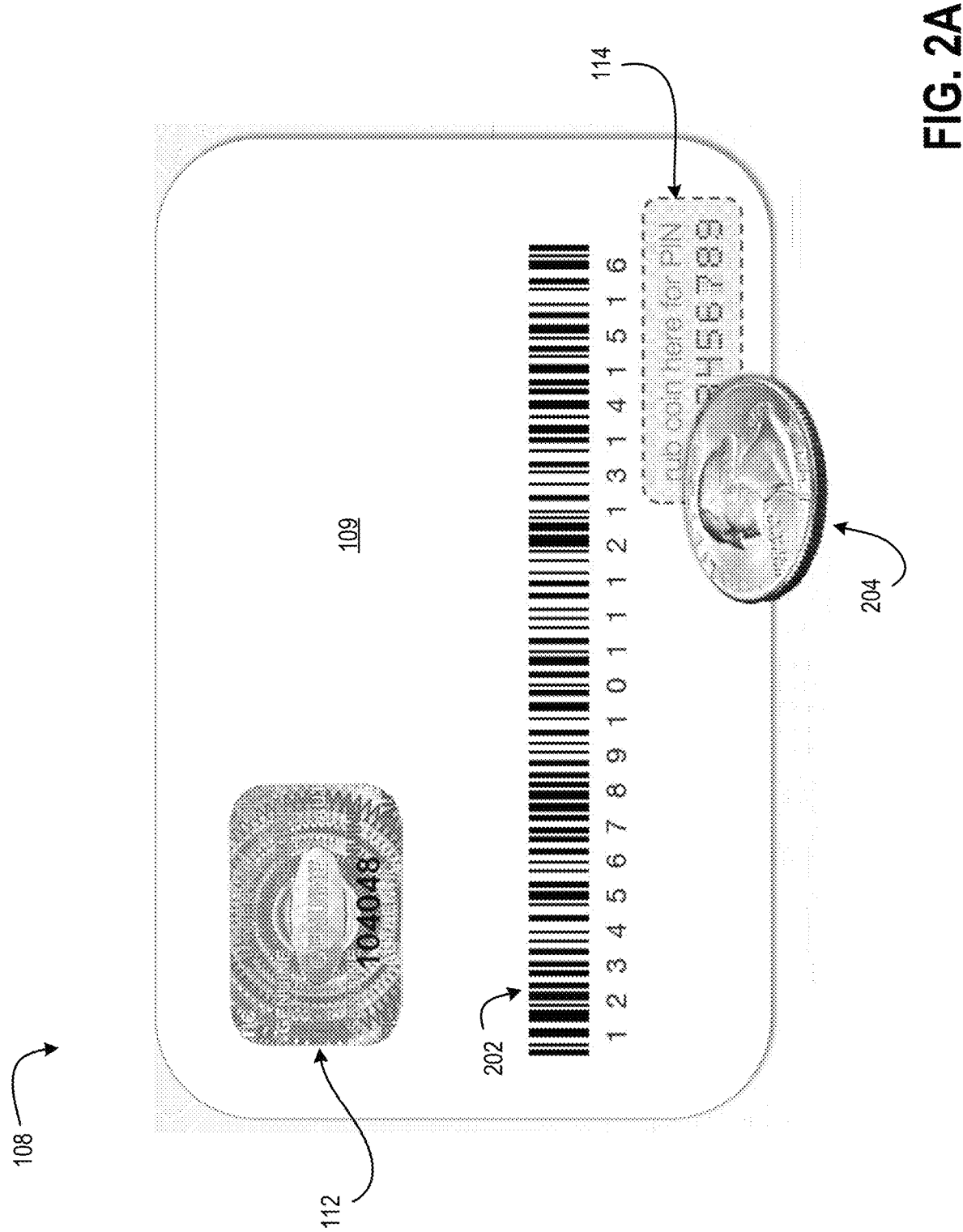
FIGS. 2A and 2B illustrate an example gift card having a coin reactive matrix and a hologram on a back surface of the gift card.
Figure 2B:
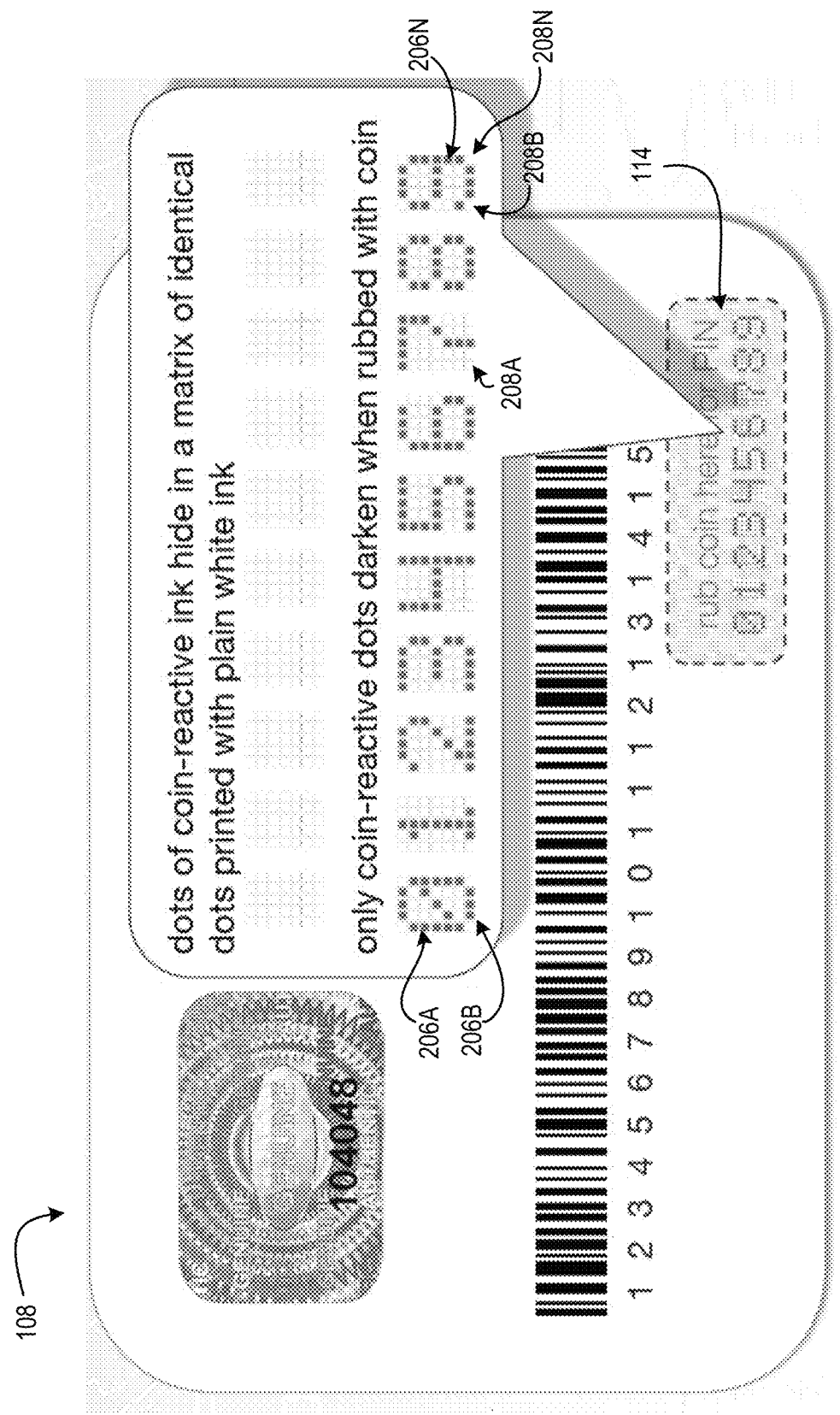

FIGS. 2A and 2B illustrate an example gift card 108 having the coin reactive matrix 114 and the hologram 112 on the back surface 109 of the gift card 108. Referring to both FIGS. 2A and 2B, the gift card 108 may also include a barcode 202 or other identifier. The barcode 202 can be scanned during a checkout process, as described in FIG. 1, to validate the gift card 108.

A guest can rub a coin 204 against the coin reactive matrix 114 to expose black coin reactive ink dots 206A-N in the matrix 114. The exposed ink dots 206A-N indicate a PIN, access code, or other identifier associated with the gift card 108. As described further in reference to FIG. 3, the black coin reactive ink dots 206A-N are interweaved in the coin reactive matrix 114 with identical white ink dots 208A-N. As a result, when the coin 204 is rubbed against the coin reactive matrix 114, only the black coin reactive ink dots 206A-N darken and become permanently visible.

Figure 3:
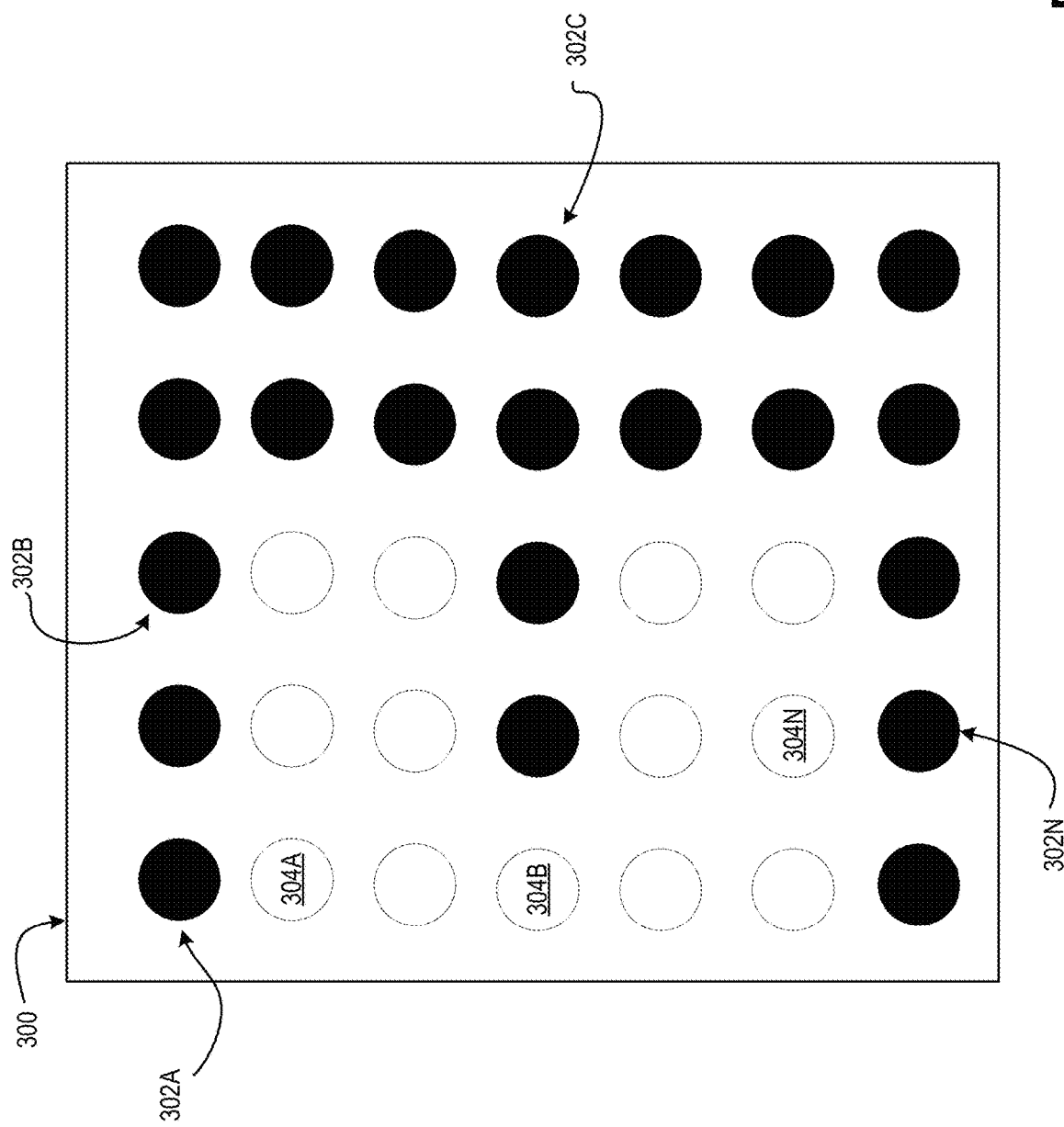
FIG. 3 illustrates an example matrix with interweaved dots of coin reactive ink and white ink, which can be applied to a back surface of a physical gift card.
Figure 6:
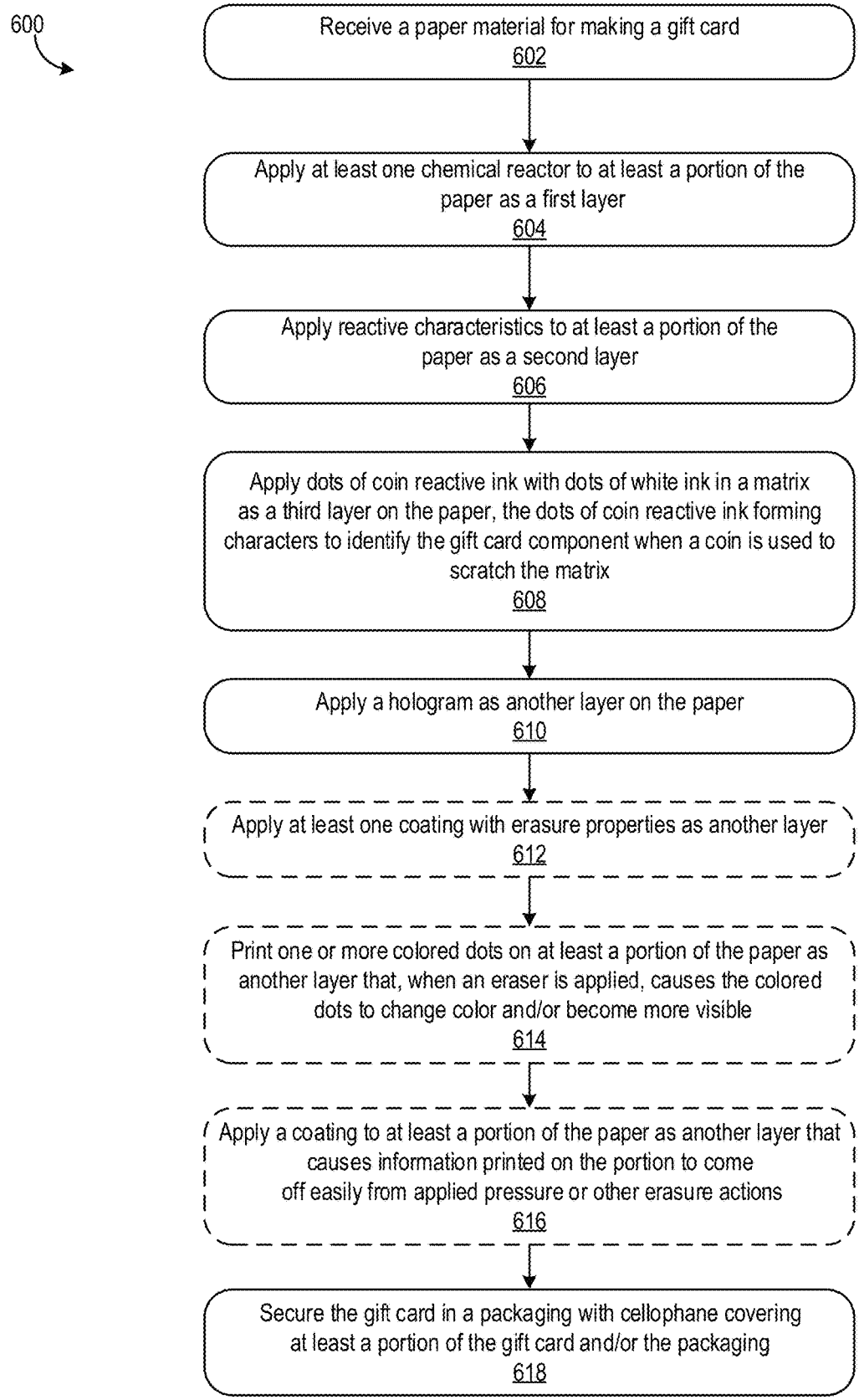
FIG. 6 is a flowchart of a process for generating a physical gift card using the disclosed techniques.
Figure 7:
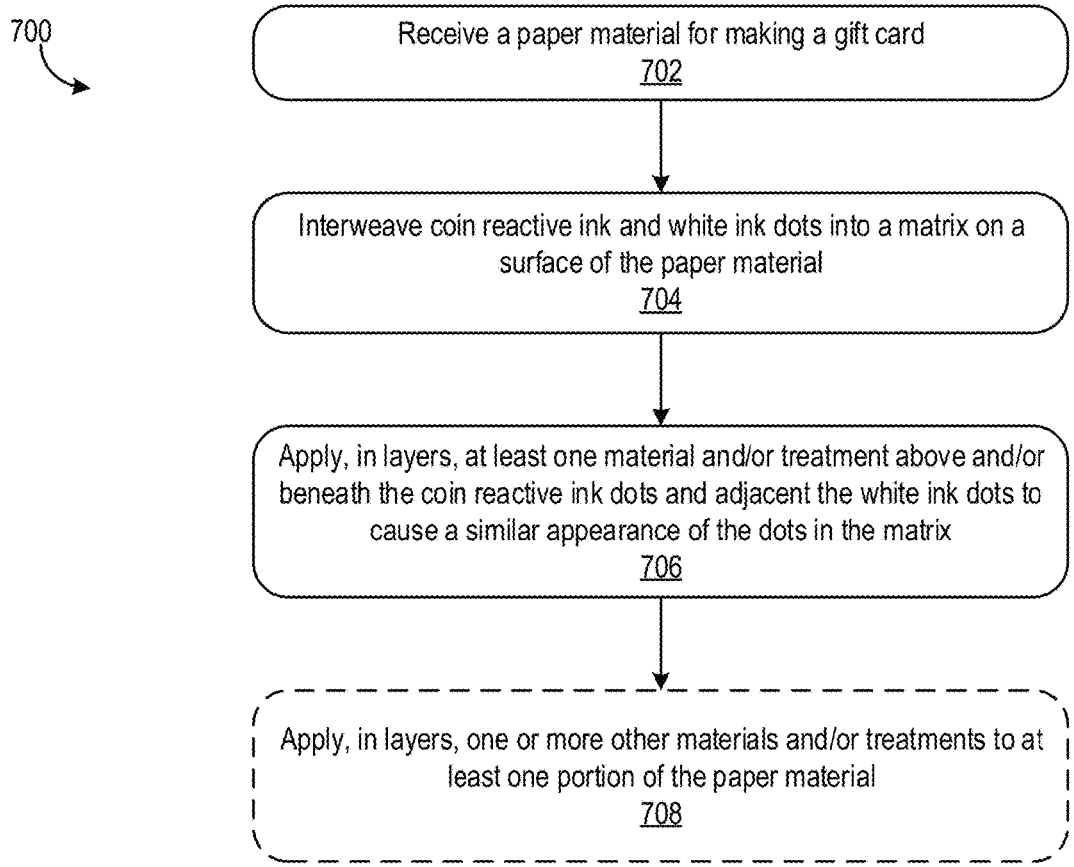
FIG. 7 is a flowchart of a process for generating a physical gift card with a matrix of interweaved dots of coin reactive ink and white ink.

FIG. 3 illustrates an example matrix 300 with interweaved dots of black coin reactive ink 302A-N and white ink 304A-N, which can be applied to a back surface of a physical gift card, as described herein. The matrix 300 can be part of the coin reactive matrix 114 described at least in reference to FIGS. 1, 2A, and 2B. When a coin is applied to (e.g., rubbed on/against) the matrix 114, the black coin reactive ink dots 302A-N become visible (or otherwise darken from being invisible to being visible dots) while the white ink dots 304A-N remain white. The example matrix 300 shows the number "3" exposed via the black coin reactive ink dots 302A-N. Refer to FIGS. 6 and 7 for further discussion about printing the matrix 300 onto the gift card with the black coin reactive ink dots 302A-N and the white ink dots 302A-N.

Figure 4:
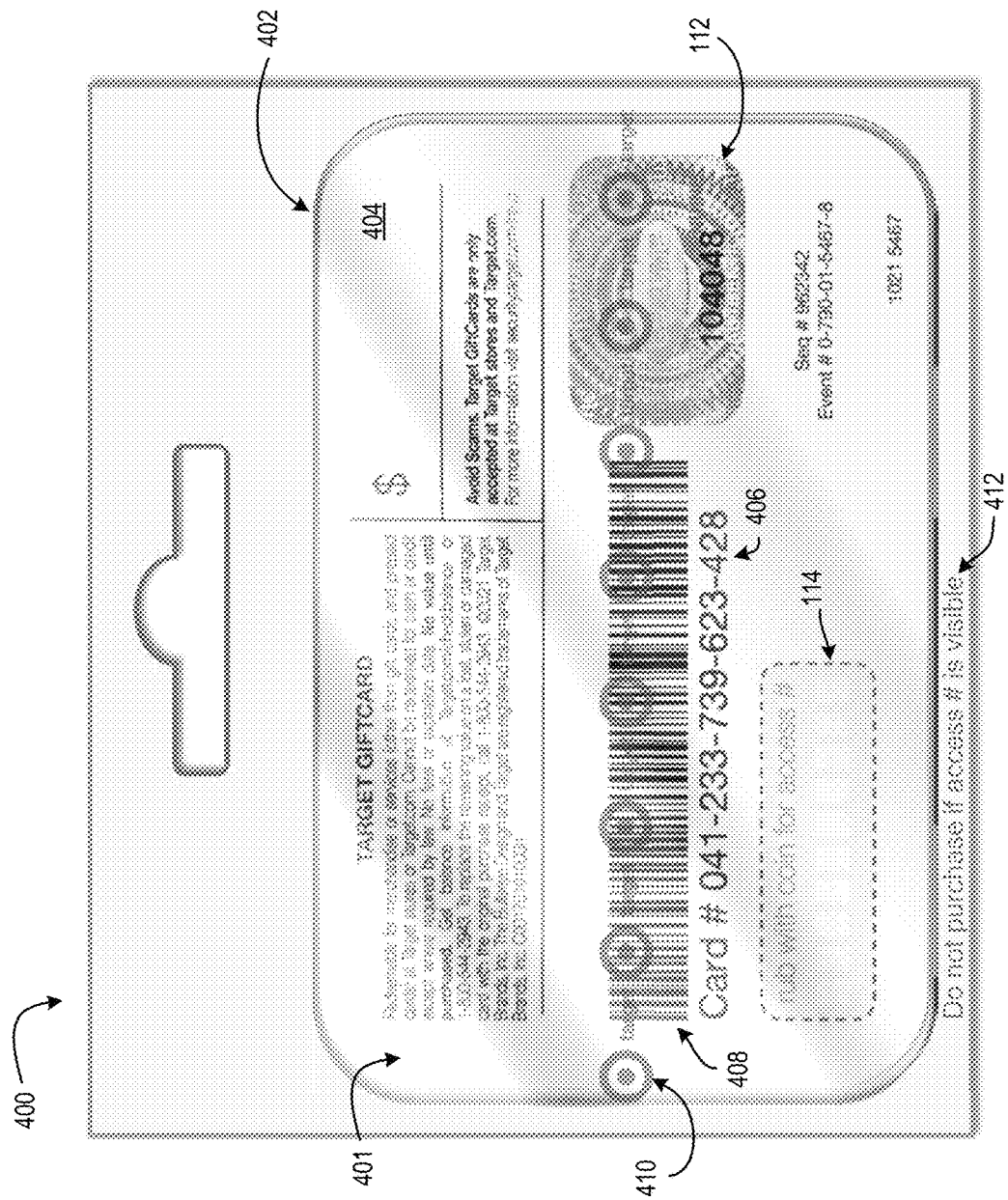
FIG. 4 illustrates an example physical gift card with cellophane packaging.

FIG. 4 illustrates an example physical gift card 402 with cellophane 401 wrapped around the gift card 402 in a package 400. The gift card 402 can be similar to or the same as the gift card 108 described herein. For example, a back surface 404 of the gift card 402 can include the hologram 112 and/or the coin reactive matrix 114. The hologram 112 can be a tamper-evidence branded hologram. A gift card with the coin reactive matrix 114 can be authenticated if the card has the hologram 112. The hologram 112 can be difficult to reproduce, especially if the hologram 112 is branded. The hologram 112 may be destroyed if a malicious actor attempts to remove it from the back surface 404 of the card 402. The back surface 404 of the gift card 402 can also include a card number 406 and/or a barcode 408.

The gift card 402 can be placed with the secure package 400. The back surface 404 of the gift card 402 can be visible when sealed within the package 400. The cellophane 402 can wrap around the package 400 to enclose the gift card 402 against/within the package 400. The package 400 can include instructions 412 printed thereon. The instructions 412 can be tampering instructions, which a guest can check to verify that the card 402 has not been tampered with before they purchase the card 402. The illustrative instructions 412 on the package 400 can indicate that the card 402 should not be purchased if an access number (e.g., a PIN) is visible in the coin reactive matrix 114. One or more other instructions 412 can be printed on the package 400, as described at least in reference to FIG. 1.

The cellophane 401 can be a branded-compostable material. The cellophane 401 can be a cellulose-based material. Branding the cellophane 401 with print 410 can make it challenging for a malicious actor to replace the cellophane 401 if the malicious actor attempts removing or cutting the cellophane 401 wrapped around the card 402 and/or the package 400. The print 410 can be applied to the cellophane 401 to show that the card 402, the package 400, and the cellophane 401 are original and authentic to the retail environment.

Figure 5A:
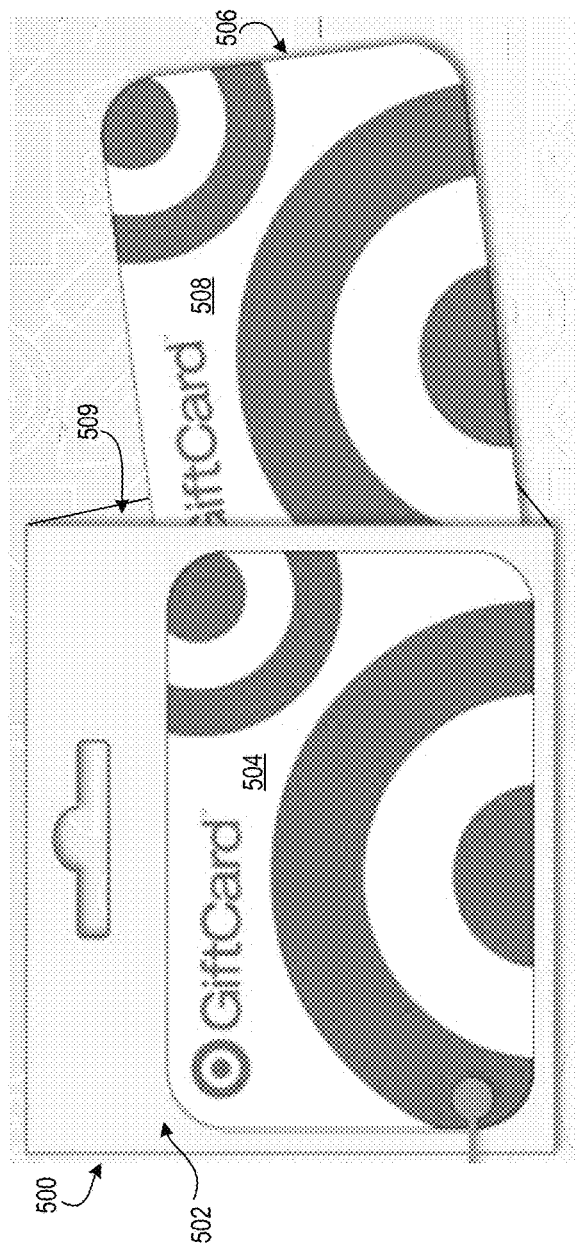
FIGS. 5A and 5B illustrate example packaging of a physical gift card described herein.
Figure 5B:
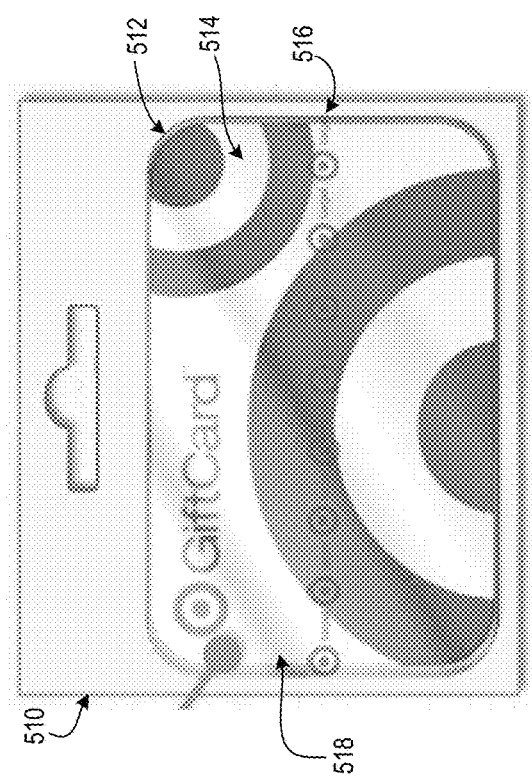
Figure 5C:
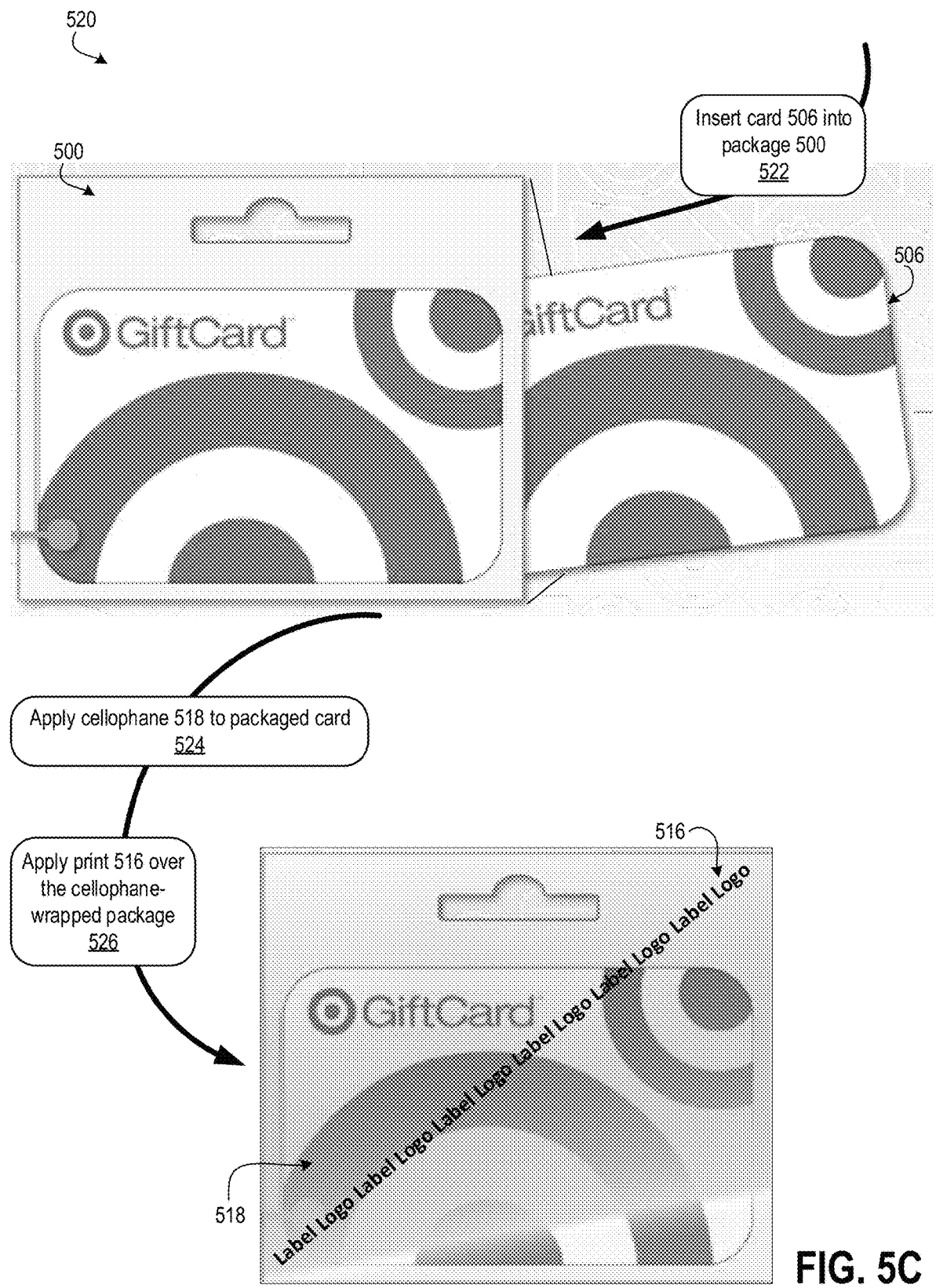
FIG. 5C illustrates a process for packaging a gift card.

In some implementations, as described in reference to FIG. 5C, artwork, graphics, and/or text can be printed onto the cellophane 401 after the card 402 is attached to the package 400 and the cellophane 401 is wrapped around the card 402 and/or the package 400 to make it more challenging for malicious actors to compromise or tamper with the package 400 and/or the card 402. In some implementations, one or more different types of ink can be used to print artwork, graphics, text, and/or branding on the cellophane 401 so that printing on the cellophane 401 appears different than printing on the package 400 and/or the card 402. For example, the printing on the cellophane 401 can appear in a different sheen, color(s), pattern, or other indicia. As a result, if a malicious actor attempts to remove the cellophane 401 and then replace that cellophane 401 with new cellophane, it would be apparent to other users that the card 401, the package 400, and/or the cellophane 401 was tampered.

The cellophane 401 can be transparent to show the untampered card 402. The cellophane 401 can also cover the coin reactive matrix 114 on the card 402 to prevent the malicious actor from rubbing a coin against the matrix 114 to expose the access number (e.g., PIN) on the card 402. The cellophane 401 is also transparent over a front surface of the card 402 so that artwork, graphics, and/or text printed on the front surface of the card 402 can be visible. In some implementations, the front of the package 400 may have artwork that is the same as the artwork on the card 402, as shown in FIG. 5A. Therefore, when the card 402 is attached to the package 400, the front surface of the card 402 may not be visible but the back surface 404 of the card 402 can be visible and covered by the cellophane 401. In such an implementation, the cellophane 401 can wrap around both the front of the package 400 and the back surface 404 of the gift card 402. In some implementations, the cellophane 401 may wrap around or otherwise cover only the back surface 404 of the gift card 402.

FIGS. 5A and 5B illustrate example packaging of a physical gift card described herein. As shown in FIG. 5A, a package 500 can be configured to receive a gift card 506. The package 500 can be similar to or the same as the package 104 described herein. The package 500 can include an envelope and/or sleeve. Sometimes, the package 500 can be sized similarly as the gift card 506. The gift card 506 can be similar to or the same as the gift card 108 described herein.

The package 500 includes an opening 509 configured to receive the gift card 506 inside the package 500. The gift card 506 can be slid into the package 500 via the opening 509, and secured to the package 500. For example, adhesives may be applied to a front surface 508 and/or a back surface of the gift card 506 to secure the gift card 506 to an interior of the package 500. Sometimes, an edge around the opening 509 of the package 500 can include adhesives so that once the gift card 506 is placed within the package 500, the package 500 can be sealed shut by the adhesives. Securing the gift card 506 inside the package 500 can ensure that the gift card 506 does not slide around within the package 500 and/or fall out of the package.

In some implementations, the package 500 may not have an opening 509 and enclosure to receive the gift card 506. Instead, the package 500 may simply be a piece of material (e.g., paper, cardboard) to which the front surface 508 of the gift card 506 attaches (e.g., via adhesives such as glue, tape, etc.). As a result, the back surface of the gift card 506, which may include a barcode, other identifying information, and/or a coin reactive matrix described herein, may be visible and exposed. Securing the front surface 508 of the gift card 506 to a side opposing a front surface 502 of the package 500 can ensure that the gift card 506 does not shift around or separate from the package 500.

As shown in FIG. 5A, the front surface 508 of the package 500 can include print 504, which can mirror print on the front surface 508 of the gift card 506. The print 504 on the package 500 can provide guidance to a relevant user (e.g., guest, team member working in a retail environment) to properly align and attach the gift card 506 to the package 500. The print 504 on the package 500 can also mirror the print on the gift card 506 so that the guest knows what print is on the gift card 506 that they are purchasing. The print 504 can include, but is not limited to, graphics, artwork, text, images, or other visual information.

As shown in FIG. 5B, a package 510 can include an opening 512 through which to view a gift card 514. The package 510 can be similar to the package 500 described in reference to FIG. 5A. For example, the package 510 can be similar to an envelope and/or a sleeve, and can include an opening for receiving the gift card 514. The gift card 514 can be secured to an inner surface of the package 510 to ensure that the gift card 514 remains attached to the package 510 and/or does not shift within the package 510. The gift card 514 can be aligned with the opening 512 in order to be viewed through the opening 512. More particularly, print (e.g., artwork) on the gift card 514 can be viewed through the opening 512 of the package 510 when the gift card 514 is appropriately attached to the package 510. In some implementations, the package 510 can have an opening on front and back surfaces of the package 510 so that front and back surfaces of the gift card 514 may be visible when attached to the package 510.

Cellophane 518, or a similar type of transparent material, can be applied to the package 510, the gift card 514, or a combination thereof. The cellophane 518 can, for example, wrap around the front and back surfaces of the gift card 514, thereby making visible any information and/or print on the gift card 514. In some implementations, additional print 516 can be applied to the cellophane 518 to as part of a branding and/or security effort. Sometimes, the print 516 may be applied to the cellophane 518 before the cellophane 518 is wrapped around the package 510, the gift card 514, or the combination thereof. The print 516 on the cellophane 518 can be used to easily and visibly identify if the package 510, the gift card 514, or the combination thereof has been tampered with. After all, a malicious actor may not be able to easily replace the cellophane 518 with cellophane having the same print 516 should the malicious actor break through the cellophane 518 applied to the package 510, the gift card 514, or the combination hereof. Refer to FIG. 5C for further discussion about packaging the gift card 514 and similar gift cards.

FIG. 5C illustrates a process 520 for packaging a gift card. The process 500 is described using the package 500 and the gift card 506 of FIG. 5A and is merely illustrative. The process 500 can be used with any other packages and gift cards described throughout this disclosure, including but not limited to the package 510 and the gift card 514 of FIG. 5B.

Referring to the process 520 of FIG. 5C, the gift card 506 can be inserted into the package 500 (block 522). Refer to FIG. 5A for further discussion.

The cellophane 518 can then be applied to the gift card 506, the package 500, or the combination thereof in block 524. For example, the cellophane 518 can be wrapped around an entirety of the package 500 including the card 506. In some implementations, the cellophane 518 can be wrapped around the gift card 506 before the card 506 is inserted into the package 500 in block 522. Sometimes, the cellophane 518 can include a different sheen, color, and/or pattern than a fully transparent material. In some implementations, the cellophane 518 can include artwork or other graphics printed thereon, which can further make it difficult for a malicious actor to replace the cellophane 518 with new cellophane if the malicious actor tampers with the cellophane 518.

The print 516 can be applied over the cellophane 518 in block 526. In some implementations, the print 516 can be applied to the cellophane 518 (and/or the cellophane 518 can be manufactured/produced with the print 516 thereon) before the cellophane 518 is applied to the packaged card.

The print 516 can be applied to extend over at least a portion of the gift card 506. The print 516 can be applied to extend over only the gift card 506. Sometimes, the print 516 can be applied to extend over a portion of the gift card 506 and a portion of the package 500. The print 516, as described in reference to FIGS. 5A and 5B, can include a logo, label, or other type of branding for the retail environment. In some implementations, the print 516 can include artwork. The artwork can be similar to or the same as the artwork on the gift card 506.

FIG. 6 is a flowchart of a process 600 for generating a physical gift card using the disclosed techniques. The process 600 can be performed to print or otherwise produce a physical gift card having an identifier, such as a PIN, access code, and/or card number, applied thereto in ink that only becomes visible once a coin is used to scratch at a location on the card having the printed PIN. Once the PIN becomes visible, it remains permanently visible, thereby making it readily apparent that the gift card has been tampered with before the card is purchased by a guest in a retail environment.

Figure 8:
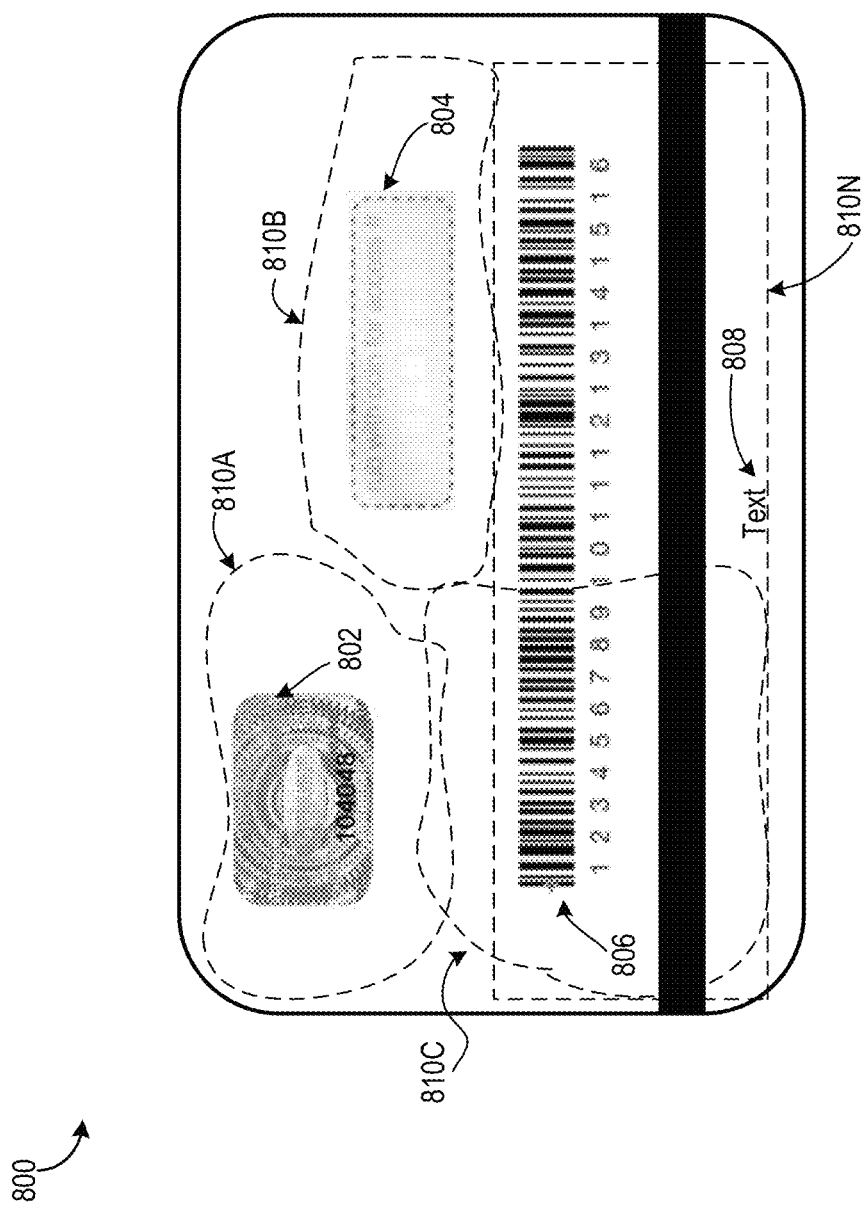
FIG. 8 illustrates an example back surface of a physical gift card having multiple different treatments applied thereto.

The process 600 can also be performed to apply one or more additional tamper-proof characteristics and/or features to the gift card, such characteristics including but not limited to holograms, applying solvents to make certain elements on the card appear or disappear, applying erasure properties, applying coatings, applying cellophane or other packaging, and/or applying other reactive properties to one or more portions of the card. Accordingly, different tampering processes and characteristics can be applied to different portions of the card. Refer to FIG. 8 for further discussion about applying these processes and characteristics to different portions of the card. In some implementations, one or more blocks in the process 600 may not be performed when generating some physical gift cards. Sometimes, one or more blocks in the process 600 can be performed in different orders than illustrated in FIG. 6.

Referring to the process 600 in FIG. 6, a paper material for making (e.g., producing, manufacturing) a gift card can be received in block 602. The paper material can be an environmentally-friendly paper. In some implementations, the paper material can be manufactured with one or more tamper-proof characteristics before the paper material is received in block 602. For example, the paper material can be manufactured with one or more chemical reactor characteristics that cause the paper material to react with one or more types of solvents and/or chemicals that may be applied to the paper material. As a result, the paper material can, for example, visibly show ink tampering.

In block 604, a chemical reactor can be applied to at least a portion of the paper material. The chemical reactor can include one or more chemicals or other substances applied to the portion of the paper material that reacts visibly on the paper material with solvents to show tampering with the portion of the paper material. The solvents that may be applied to tamper the paper material can include, but are not limited to, bleach, paint thinner, alcohols, etc. The chemical reactive paper material can be treated with agents that become visible when a chemical alteration is attempted to the paper material. Various chemical reactors may be used alone or in combination, including but not limited to oxidants, polar and non-polar solvents, inorganic acids, bases (e.g., alkalis), and/or reducers.

The chemical reactor can be applied as a first layer to the paper material. In some implementations, if other reactive characteristics and/or properties are applied to the paper material, the chemical reactor can be applied in a same or different layer as the other properties. The chemical reactor can also be applied to the paper material before, at a same time, or after one or more other properties are applied to the paper. In some implementations, the paper material may be manufactured or otherwise produced with the chemical reactor, so block 604 may not be performed.

Reactive characteristics can be applied to at least a portion of the paper as a second layer in block 606. The second layer can be applied on top of the first layer. The reactive characteristics can allow for coin reactive ink to become visible when a coin is rubbed against a surface of the paper having the coin reactive ink. As a result, the coin reactive ink applied to the paper material can react with the coin applied thereto. In some implementations, the chemical reactor and the reactive characteristics can be applied as a same layer to at least the portion of the paper. Sometimes, the paper material can be manufactured with the chemical reactor and the reactive characteristics. As a result, blocks 604 and 606 may not be performed in the process 600. In some implementations, the reactive characteristics can be applied to a portion of the paper that is different than the portion of the paper where the chemical reactor is applied. Sometimes, the reactive characteristics may not need to be applied to the paper, and block 608 can be performed after performing block 604.

Dots of coin reactive ink with dots of white ink can be applied in a matrix as a third layer on the paper (block 608). The third layer can be applied on top of and/or after applying the first layer and the second layer to the paper material. In some implementations, the matrix can be applied in a layer before applying the reactive characteristics and/or solvents described above in reference to blocks 604 and 606. The dots of coin reactive ink can form characters to identify the gift card component when the coin is used to scratch or rub against the matrix. The characters can represent a PIN, access code, card number, or other unique identifier or the gift card. As described herein, the coin reactive ink and the white ink can both be applied to the matrix to prevent a potentially malicious actor from trying to read the characters formed using the coin reactive ink without scratching at the matrix with the coin. The dots of black coin reactive ink and white ink can have same or similar characteristics (e.g., height, texture, sheen) to make it challenging or impossible for the actor to identify the characters without scratching the matrix with the coin. Refer to FIG. 7 for further discussion.

In block 610, a hologram can be applied as another layer on the paper. Sometimes, the hologram can be applied as part of the third layer. The hologram can be applied to the paper before, during, or after one or more of the other blocks described in the process 600. The hologram, as described throughout this disclosure, can be a security emblem that is unique to a particular retail environment. The hologram can be tamper proof or otherwise can visually show when an actor attempts to tamper it. For example, if the actor attempts to remove the hologram, the hologram can be damaged and can leave residue or other tampering characteristics on a surface of the paper. Moreover, the hologram can be uniquely designed for the retail environment such that the actor cannot simply or easily replicate the hologram and attach it to any gift card. In some implementations, the gift card may be manufactured/generated without the hologram. As a result, block 610 may not be performed in the process 600.

Additionally or alternatively, at least one coating with erasure properties can optionally be applied as another layer to the card (block 612). The at least one coating can be applied in same or different layers to the card as described in the process 600. The at least one coating can be applied in another layer before, during, or after performing one or more other blocks in the process 600. In some implementations, the erasure properties can include properties to cause erasure marks to become permanently visible on the paper material, thereby indicating that the paper was tampered with. The erasure properties can be applied to a portion of the paper having an access code or other card identifying information. For example, the erasure properties can be applied to the portion of the paper where the access code is to be printed and the access code can be printed in a layer on top of the erasure properties. Therefore if a malicious actor tampers with the gift card, exposes the access code, then attempts to erase evidence of their tampering, the erasure properties of the gift card causes a background color beneath the access code to also erase. Once the background color is erased, the tampering performed by the malicious actor is permanently exposed.

Additionally or alternatively, one or more colored dots can optionally be printed on at least a portion of the paper as another layer (block 614). Sometimes, the colored dots can interact with the erasure properties applied to the paper in block 612 to cause the colored dots to become more visible. The colored dots can have properties to change color and/or become more visible when an eraser or other erasing material is applied to the portion of the paper having the colored dots. For example, the colored dots can be light blue. As an eraser is applied to a portion of the paper having the light blue dots, the light blue dots can change to a brighter and/or white color. Therefore, if the actor attempts to erase the portion of the paper having the colored dots, the colored dots become more visible to indicate that the paper was tampered with. The colored dots can be printed onto various different portions of the paper described herein and/or all over the paper. The another layer can be the same as or different than one or more other layers described herein. In some implementations, the block 614 can be performed before, during, or after one or more other blocks described herein.

In some implementations, printing the colored dots onto the paper material may include embedding and randomly distributing security planchettes into the paper material. The security planchettes can include small, non-reproducible dots that can assist a relevant user in visually validating an authentic gift card. Sometimes, fluorescent planchettes can be embedded into the paper material to change color under ultraviolet light. Sometimes, non-fluorescent planchettes can be manually removed from the paper material. In some implementations, chemically-reactive planchettes may change color upon contact with a solvent, such as an alkaline solution. Sometimes, thermochromic planchettes can be used to change color in response to heat contact. Bi-thermochromic planchettes may also be used to change to multiple different colors in response to heat contact. Various other color dot printing techniques may be used to further secure the gift card.

Additionally or alternatively, a coating can optionally be applied to at least a portion of another layer that causes information printed on the portion of the another layer to come off easily from applied pressure and/or other erasure actions (block 616). Additionally or alternatively, the coating may cause a portion of the paper to change color if a potentially malicious actor attempts to erase the portion of the paper. The coating applied to the another layer can interact with one or more other coatings, layers, properties, and/or characteristics that are applied to the paper material in one or more layers. The another layer can be the same as one or more other layers described herein. The another layer can be different than the other layers described herein. In some implementations, the block 616 can be performed before, during, or after one or more other blocks described herein.

Any of the layers of properties, characteristics, and/or coatings can be applied to different portions of the paper. Sometimes, one or more applications of the properties, characteristics, and/or coatings may overlap on the paper. In some implementations, one or more of the properties, characteristics, and/or coatings may not overlap. Moreover, any of the blocks 612-616 can be performed in any order and/or as part of one or more of the blocks 602-610.

In block 618, the gift card can be secured in a packaging with cellophane covering at least a portion of the gift card and/or the packaging. Refer to at least FIGS. 5A, 5B, and 5C for further discussion about securing the gift card in the packaging.

Refer to FIG. 7 for further discussion about printing the PIN or other unique identifier onto the gift card using a combination of coin reactive ink and white ink in a matrix. Refer to at least FIG. 9 for further discussion about applying layers of solvent, erasure, coating, and other security characteristics when generating (e.g., producing) a gift card. Refer to FIGS. 4, 5A, 5B, and 5C for further discussion about packaging the gift card.

FIG. 7 is a flowchart of a process 700 for generating a physical gift card with a matrix of interweaved dots of coin reactive ink and white ink. The process 700 can be performed to ensure that unique identifying information, such as a PIN or access code, can be securely printed and tamper-proof on the gift card. One or more blocks in the process 700 can be performed in one or more different orders. The process 700 can be performed as part of the process 600 in FIG. 6.

Referring to the process 700 in FIG. 7, a paper material for making a gift card can be received in block 702. Commercial print equipment can be used to generate the gift card using the paper material. Some properties described herein, such as chemical reactors, can be applied to the paper material prior to printing the gift card with identifying information or other information. The paper material, with the properties applied thereto, can then be passed through the commercial printing equipment to print information onto the card.

Coin reactive ink and white ink dots can be interweaved into a matrix on a surface of the paper material in block 704. The ink dots can be interweaved into the matrix in a layer on the paper material. A dot matrix printer can be used to print the coin reactive ink dots and the white ink dots onto the paper material. The coin reactive ink can appear transparent or invisible when applied or printed onto the paper material. The coin reactive ink can become visible and darken into a black or other color when a coin is rubbed against the matrix. Rubbing the coin against the matrix may not cause the white ink dots to change appearance. The white ink dots may not have grit, thereby making it challenging or impossible to differentiate the white ink dots from a background of the matrix when the gift card is positioned at different angles.

At least one material and/or treatment can be applied, in layers, above and/or beneath the coin reactive ink dots and adjacent the white ink dots to cause a similar appearance of the dots in the matrix (block 706). The similar appearance can include a similar or same height across the surface of the paper material so that the coin reactive ink dots have the same appearance as the white dots.

For example, additional ink and/or material can be injected into the matrix and around the coin reactive ink dots and the white ink dots such that there are no gaps in space or height between each of the dots in the matrix. When a user runs a finger across the matrix, for example, they may not be able to feel a difference between the different types of dots that are printed into the matrix. As a result, the coin reactive ink dots may not be easily identifiable on the surface of the paper material to make out characters formed by those dots. A user would only be able to uncover the characters by rubbing a coin over the matrix.

In some implementations, a material or sheen can be applied to the dots in the matrix to cause a similar appearance of the coin reactive ink dots and the white ink dots before a user rubs a coin against the matrix. Sometimes, block 706 can be performed as part of block 704. In other words, instead of applying treatments and/or materials in additional layers on top of or below the matrix, the treatments and/or materials can be applied in combination with interweaving the inks into the matrix.

Figure 9:
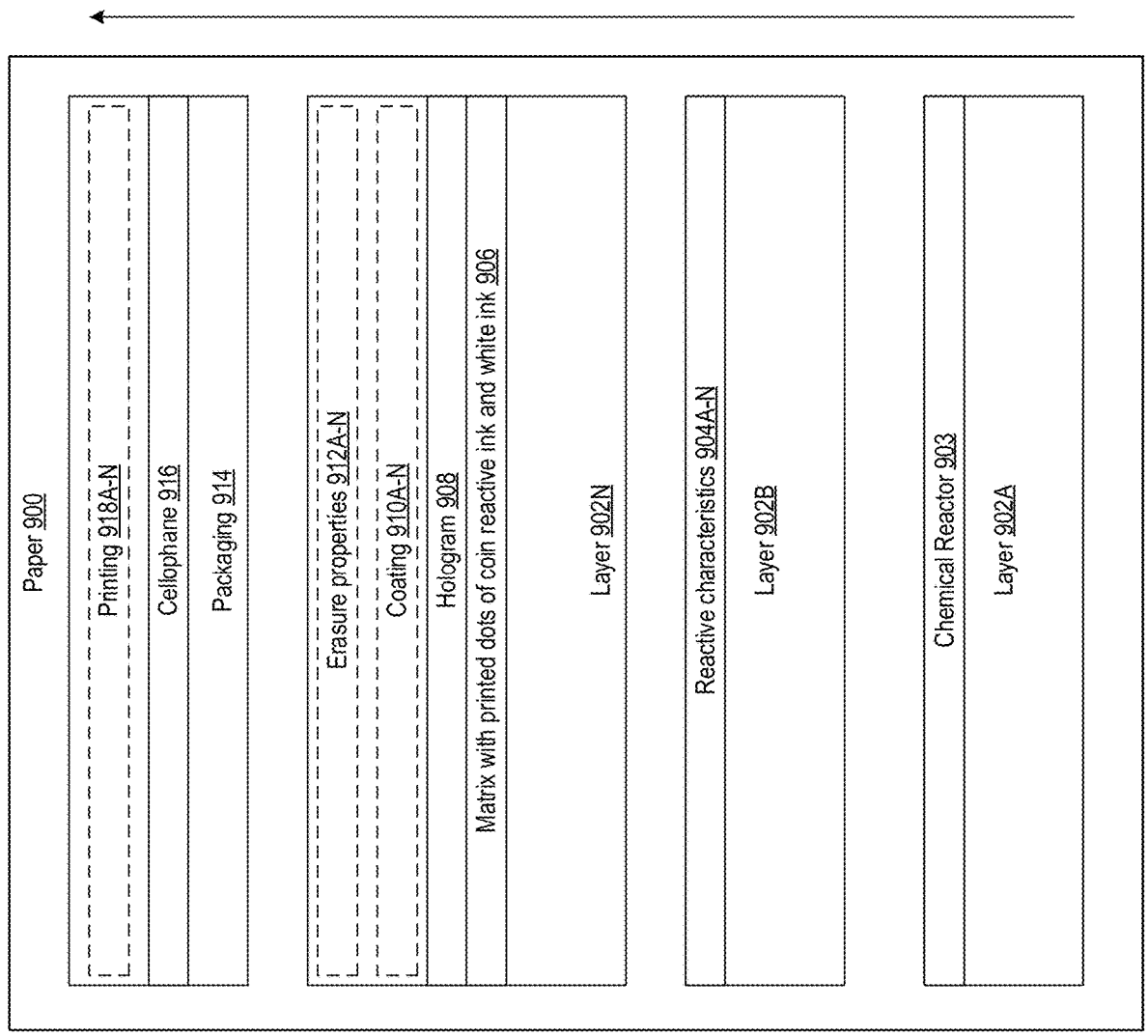
FIG. 9 is a conceptual diagram illustrating properties and characteristics that are applied to or otherwise printed onto a paper material in layers for generating a physical gift card.

Additionally or alternatively, one or more other materials and/or treatments can optionally be applied to at least one portion of the paper material (block 708). The additional materials and/or treatments can be applied in one or more layers on top of and/or below the matrix. Refer to FIGS. 6, 8, and 9 for further discussion about characteristics and properties of the materials and the treatments that may be applied to the gift card.

FIG. 8 illustrates an example back surface 800 of a physical gift card having multiple different treatments applied thereto. The treatments can be applied in one or more layers 810A-N. The treatments can include properties and/or characteristics intended to make the back surface 800 of the gift card tamperproof. One or more of the layers 810A-N may overlap, each having different treatments (e.g., properties). For example, as shown in the example back surface 800 of the gift card, the layers 810A, 810C, and 810N may overlap with different characteristics. The layer 810B, on the other hand, may not overlap with any of the other layers 810A-N and can have a treatment that is unique from all the other treatments of the other layers 810A-N.

The back surface 800 of the gift card includes a hologram 802, a matrix 804, a barcode 806, and text 808. The back surface 800 of the gift card can include one or more additional or alternative elements and/or features, as described throughout this disclosure. The back surface 800 can be a card stock material that can meet one or more regional paper and/or sustainability requirements. The text 808 can be printed onto the back surface 800 of the gift card in permanent tamper-resistant ink. Sometimes, one or more reactive characteristics and/or erasure properties can be applied as part of the layer 810N to prevent the text 808 from being removed from the back surface 800 using any type of tampering techniques, such as applying solvents or chemicals to the back surface 800 and/or applying an eraser to the back surface 800. In some implementations, the text 808 can be printed onto the back surface 800 with ink that seeps into the material of the back surface 800. The type of ink used for the text 808 can further expose attempted tampering when the ink of the text 808 reacts with solvents that may be applied to the back surface 800 by a potentially malicious actor. The type of ink used for the text 808 may be different than the type of ink(s) used for the matrix 804. For example, coin reactive ink may only be used for the matrix 804.

One or more characteristics and/or treatments can be applied as part of the layer 810A over and/or beneath the hologram 802. The layer 810A can include erasure properties that make tampering attempts clearly visible. For example, if the malicious actor attempts to remove or peel off the hologram 802 (which can be applied like a sticker to the back surface 800 of the gift card), a printing or remnants of the hologram 802 can appear at a location of the hologram 802 on the back surface 800. As another example, if the malicious actor attempts to remove or peel off the hologram 802 (e.g., their fingers pick at the hologram 802, thereby causing heat and friction around the hologram 802), a color, pattern, and/or texture of the back surface 800 surrounding the hologram 802 can darken or change color, thereby exposing potential tampering.

One or more characteristics and/or treatments can be applied as part of the layers 810C and/or 810N, such as erasure properties. The erasure properties can be applied over and/or beneath the barcode 806 to prevent the barcode from being erased or otherwise removed from the back surface 800 using any types of chemicals, solvents, heat, and/or erasers. The barcode 806 may also be printed onto the back surface 800 with permanent ink. The ink can seep into the back surface 800 to make it impossible for the ink to be removed or erased from the back surface 800.

One or more characteristics and/or treatments can be applied as part of the layer 810B to prevent tampering with the matrix 804. As an illustrative example, erasure properties can be applied as part of the layer 810B so that if the malicious actor attempts to erase the matrix 804, the back surface 800 surrounding the matrix 804 may darken or otherwise change color or appearance. Sometimes, the back surface 800 surrounding the matrix 804 may turn white or otherwise brighten when an eraser is applied to the matrix 804. Sometimes, the back surface 800 surrounding matrix 804 may actually be removed when the malicious actor attempts to erase the matrix 804 (e.g., if the back surface 800 includes artwork, color, or other printing, such artwork/color/printing may be removed), thereby visibly showing attempts to tamper the gift card.

In some implementations, solvent characteristics can be applied in one or more of the layers 810A-N that do not overlap with or otherwise interfere with other tamperproof characteristics and/or processes. For example, the solvent characteristics may not be applied in the layers 810C and/or 810N since the solvent characteristics may interfere with processes to scan the barcode 806 with a scanning device. As another example, the solvent characteristics may not be applied in layers where erasure properties are applied, such as in the layer 810B. In some implementations, one or more other characteristics and/or properties can be applied in layers to portions of the paper material. As merely illustrative examples, security fibers can be embedded into the paper material, which can become visible under ultraviolet light.

FIG. 9 is a conceptual diagram illustrating properties and characteristics that are applied to or otherwise printed onto a paper material 900 in layers 902A-N for generating a physical gift card. As shown in FIG. 9, characteristics that provide and improve security and tamper-proof features of the gift card can be applied to the paper material in one or more of the layers 902A-N. The properties applied to the paper material 900 can provide minimal yet effective mechanisms for easily and accurately identifying tampering with the paper material 900. Guests and team members in retail environments can readily identify the tampering without requiring training or some other understanding of what tampering may look like on the paper material 900.

A chemical reactor 903 can be applied to the paper material 900 in a first layer 902A. The chemical reactor 903 can cause text or other characters printed on the paper material 900 to become visible when a reactor to the chemical reactor 903 is applied to the paper material 900. In some implementations, the chemical reactor 903 can also be applied as the layer 902A to prevent the text or other characteristics from being removed from the gift card when certain materials, liquids, and/or solvents are applied to the gift card. The chemical reactor 903 can be applied in the layer 902A to only certain portions of the paper material 900, such as a portion having a barcode. As a result, the barcode may not be removed from the paper material 900 if a user attempts to remove the barcode. If a solvent, chemical, or other reactor that reacts with the chemical reactor 903 is applied to the paper material 900 (and specifically the portion of the paper material 900 where the layer 902A was applied, such as the barcode), the paper material 900 can become discolored (e.g., brown, another color, pattern, or indicia). The discoloration in the paper material 900 can indicate that a user attempted to tamper with the paper material 900.

After the chemical reactor 903 is applied as the layer 902A, an additional layer 902B can be applied to the paper material 900. More specifically, reactive characteristics 904A-N can be applied as the additional layer 902B.

One or more additional or other layers 902N can be applied to the paper material 900 after the layer 902A and/or the layer 902B. As described herein, other characteristics can be applied as part of the layers 902N. For example a matrix with printed dots of coin reactive ink and white ink 906 can be applied as one or more of the layers 902N. Additionally or alternatively, a hologram 908 can be applied as one or more of the layers 902N. Optionally, one or more coatings 910A-N can be applied as one or more of the layers 902N. Optionally, one or more erasure properties 912A-N can be applied as one or more of the layers 902N.

Once the paper material 900 has been prepared as described herein, packaging 914 can be applied to the paper material 900. The packaging 914 can include an envelope, sleeve, wrap, or other type of material that can be wrapped around and secured to at least one side and/or edge of the paper material 900, the paper material forming the gift card. Cellophane 916 can also be applied to the paper material 900 as part of the packaging 914. For example, the cellophane 916 can wrap around an entirety of the paper material 900 forming the gift card. The cellophane 916 can wrap around the paper material 900 and the packaging 914. The cellophane 916 can wrap around a portion of the paper material 900 and/or the packaging 914. Optionally, printing 918A-N can be applied to the packaging 914 and/or the cellophane 916. For example, the printing 918A-N can include branding, text, a logo, and/or images, which can be printed onto the cellophane 916 after the cellophane 916 is applied to the paper material 900 and/or the packaging 914. Sometimes, the printing 918A-N can be applied to the cellophane 916 before the cellophane 916 is wrapped around the paper material 900 and/or the packaging 914. Sometimes, the printing 918A-N can be part of the cellophane 916 and/or the packaging 914.

FIG. 9 is merely an illustrative example for applying various tamperproof characteristics to the paper material 900 to manufacture/produce a physical gift card. One or more other characteristics, traits, and/or properties may also be applied to the paper material 900 in one or more fewer and/or additional layers.

Figure 10:
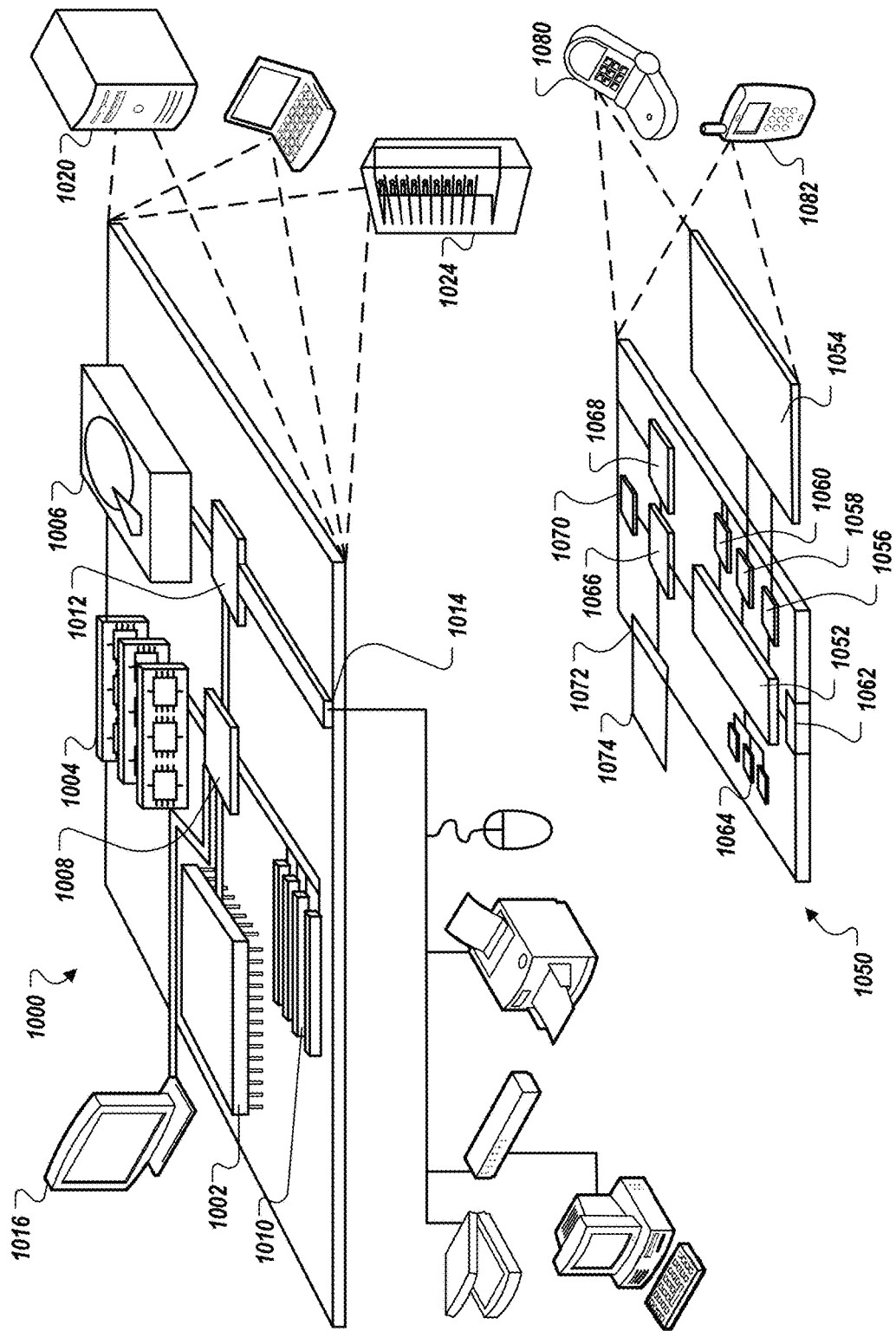
FIG. 10 is a schematic diagram that shows an example of a computing device and a mobile computing device.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this disclosure.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claim.

What is claimed is:

1. A gift card comprising:
a first identifier printed in permanent and visible ink on a first portion of the gift card, wherein attempting to remove the first identifier causes visible indicators of tampering on the first portion of the gift card, wherein the first portion of the gift card is treated with one or more chemicals to cause the visible indicators of tampering thereon;
a second identifier printed in a matrix of ink dots on a second portion of the gift card that, as printed, obscure the second identifier, wherein the matrix comprises reactive ink dots and other non-reactive ink dots that, as printed, have a same visible appearance, wherein the second identifier is represented by the reactive ink dots, wherein the reactive ink dots are configured to have a different visible appearance from the non-reactive ink dots when the matrix is rubbed by a physical object, wherein rubbing the matrix with the physical object is configured to cause the reactive ink dots and the non-reactive ink dots to have the different physical appearances so that the second identifier becomes visible; and
tamperproof properties applied in one or more layers to the first and second portions of the gift card, and wherein the tamperproof properties are configured to cause modifications to the first or second portions of the gift card to become permanently visible.

2. The gift card of claim 1, wherein:
attempting to remove the first identifier comprises applying a physical eraser object to the first portion of the gift card having the first identifier,
the tamperproof properties applied to the first portion of the gift card comprises anti-erasure properties, and
the visible indicators of tampering on the first portion of the gift card comprise (i) discoloration or (ii) a change in texture.

3. The gift card of claim 1, wherein the first identifier comprises a barcode.

4. The gift card of claim 1, wherein:
the tamperproof properties applied to the second portion of the gift card comprises reactive properties, and
when a chemical or solvent is applied to the second portion of the gift card in an attempt to tamper with the second identifier printed in the matrix, the second portion of the gift card changes in appearance, wherein the change in appearance comprises at least one of a change in color or a change in texture.

5. The gift card of claim 1, wherein:
the tamperproof properties applied to the second portion of the gift card comprises anti-erasure properties, and
when a physical eraser object is applied to the second portion of the gift card in an attempt to tamper with the second identifier printed in the matrix, the second portion of the gift card changes in appearance.

6. The gift card of claim 1, further comprising packaging that is configured to removably attach to at least an edge of the gift card, wherein the second portion of the gift card is visible when removably attached to the packaging.

7. The gift card of claim 6, wherein the packaging comprises artwork that is the same as artwork on the front surface of the gift card, wherein the artwork on the front surface of the gift card aligns with the artwork on the packaging and, when the gift card is removably attached to the packaging, the artwork on the front surface of the gift card is not visible.

8. The gift card of claim 6, wherein the packaging comprises an envelope, the envelope defining an opening to receive the gift card therein, wherein the gift card is removably attached to an interior side of the envelope.

9. The gift card of claim 1, wherein the gift card comprises a first surface and a second surface opposite the first surface.

10. The gift card of claim 9, wherein the first surface comprises at least one of the first identifier or the second identifier.

11. The gift card of claim 9, wherein the second surface comprises at least one of the first identifier or the second identifier.

12. The gift card of claim 1, wherein the gift card further comprises a hologram, and wherein attempting to remove the hologram causes visible damage to at least one of the hologram or an area of the gift card to which the hologram was affixed.

13. The gift card of claim 1, wherein the second identifier comprises a unique identifier for the gift card or a PIN for the gift card.

14. The gift card of claim 1, wherein one or more of the first and second portions of the gift card overlap with each other.

15. A method for generating a physical gift card with tamperproof properties, the method comprising:
   receiving a paper material for generating a physical gift card;
   treating a first portion of the gift card with one or more chemicals to cause visible indicators of attempted tampering thereon;
   printing a first identifier in permanent and visible ink on the treated first portion of the paper material;
   printing a second identifier in a matrix of ink dots on a second portion of the gift card that, as printed, obscure the second identifier, wherein the matrix comprises reactive ink dots and other non-reactive ink dots that, as printed, have a same visible appearance, wherein the second identifier is represented by the reactive ink dots, wherein the reactive ink dots are configured to have a different visible appearance from the non-reactive ink dots when the matrix is rubbed by a physical object, wherein rubbing the matrix with the physical object is configured to cause the reactive ink dots and the non-reactive ink dots to have the different physical appearances so that the second identifier becomes visible; and
   applying, in layers, one or more additional tamperproof properties to the first or second portions of the paper material, wherein the additional tamperproof properties are configured to cause attempts at tampering with the first or second identifiers to become visible on the paper material.

16. The method of claim 15, wherein the applying step is performed before printing the first and second identifiers.

17. The method of claim 15, wherein applying, in layers, one or more additional tamperproof properties to the first or second portions of the paper material comprises applying, in a first layer, chemical reactor properties to the first or second portions of the paper material, wherein the chemical reactor properties cause the first or second portions of the paper material to change in appearance when an attempt to tamper the paper material has been made, wherein the change of appearance comprises a change in color or a change in texture to the first or second portions of the paper material.

18. The method of claim 15, wherein applying, in layers, one or more additional tamperproof properties comprises affixing a hologram to a third portion of the paper material, wherein affixing the hologram to the third portion of the paper material cause the third portion of the paper material to show visible damage when an attempt to tamper with the hologram has been made.

19. The method of claim 15, wherein applying, in layers, one or more additional tamperproof properties to the first or second portions of the paper material comprises applying anti-erasure properties to the first or second portions of the paper material, wherein the anti-erasure properties cause erasure marks on the first or second portions of the paper material to become permanently visible when an attempt to tamper with the paper material has been made.

20. The method of claim 15, further comprising removably attaching the gift card to a packaging, wherein at least an area of the gift card remains visible when attached to the packaging.

* * * * *